(12) United States Patent
Harris et al.

(10) Patent No.: US 7,267,746 B1
(45) Date of Patent: Sep. 11, 2007

(54) DIVIDING WALL DISTILLATION COLUMN CONTROL APPARATUS

(75) Inventors: James W. Harris, Prospect Heights, IL (US); Steven P. Rosenblum, Buffalo Grove, IL (US); Michael A. Schultz, Chicago, IL (US); Dennis E. O'Brien, Arlington Heights, IL (US); Douglas G. Stewart, Wheeling, IL (US)

(73) Assignee: UOP LLC, Des Plaines, IL (US)

( * ) Notice: Subject to any disclaimer, the term of this patent is extended or adjusted under 35 U.S.C. 154(b) by 252 days.

(21) Appl. No.: 10/650,570

(22) Filed: Aug. 27, 2003

Related U.S. Application Data

(63) Continuation of application No. 09/793,250, filed on Feb. 26, 2001, now abandoned.

(51) Int. Cl.
*B01D 3/42* (2006.01)

(52) U.S. Cl. .......................... 202/160; 202/158; 203/2; 203/99; 203/DIG. 18; 203/DIG. 19; 196/111

(58) Field of Classification Search ................ 202/158, 202/160; 203/2, 99, DIG. 18, DIG. 19; 196/111, 196/132
See application file for complete search history.

(56) References Cited

U.S. PATENT DOCUMENTS

| | | | | |
|---|---|---|---|---|
| 2,471,134 A | | 5/1949 | Wright | 196/100 |
| 2,725,351 A | | 11/1955 | Grote | 202/160 |
| 3,773,627 A | * | 11/1973 | Weber et al. | 203/2 |
| 3,793,157 A | * | 2/1974 | Hobbs et al. | 203/2 |
| 3,830,698 A | * | 8/1974 | Kleiss | 203/2 |
| 4,024,027 A | * | 5/1977 | Boyd | 203/2 |
| 4,230,533 A | | 10/1980 | Giroux | 203/1 |
| 4,252,614 A | * | 2/1981 | Stewart | 203/1 |
| 4,367,121 A | * | 1/1983 | Furr | 203/2 |
| 4,587,370 A | | 5/1986 | DeGraff | 585/450 |
| 4,617,092 A | * | 10/1986 | Hiramatsu | 203/1 |
| 4,894,145 A | * | 1/1990 | Jensen | 208/350 |
| 5,276,231 A | | 1/1994 | Kocal et al. | 585/323 |
| 5,334,793 A | | 8/1994 | Kocal | 585/323 |
| 5,344,544 A | * | 9/1994 | North et al. | 204/401 |
| 6,069,285 A | | 5/2000 | Fritsch et al. | 585/449 |
| 6,291,734 B1 | * | 9/2001 | Stork | 585/809 |
| 6,417,420 B1 | | 7/2002 | Stewart et al. | 585/323 |
| 6,551,465 B1 | | 4/2003 | Van Zile et al. | 202/158 |
| 6,558,515 B1 | * | 5/2003 | Steacy | 203/1 |
| 6,605,190 B1 | * | 8/2003 | Salamon et al. | 203/1 |

OTHER PUBLICATIONS

Mutalib, M.I. Abdul et al. *Operation and Control of Dividing Wall Distillation Columns (Part 1)* Trans IchemE, vol. 76, Part A, Mar. 1998, 308-318.

(Continued)

*Primary Examiner*—Virginia Manoharan
(74) *Attorney, Agent, or Firm*—James C. Paschall; Michael A. Moore

(57) ABSTRACT

A control apparatus and control method for controlling the separation in a dividing wall distillation column of at least two feeds into at least three products is disclosed. The apparatus uses a temperature measuring device to measure the temperature of fluid in the column, a controller, and a means for adjusting the temperature of fluid in the column. The temperature measuring device may be on either side of the dividing wall or above or below the dividing wall, and more than one such device may be used. The apparatus and method may be used in the production of alkylaromatic hydrocarbons by alkylating aromatic hydrocarbons with olefinic hydrocarbons.

2 Claims, 3 Drawing Sheets

OTHER PUBLICATIONS

Mutalib, M.I. Abdul et al. *Operation and Control of Dividing Wall Distillation Columns (Part 2)* Trans IChemE, vol. 76, Part A, Mar. 1998, pp. 319-334.

Lestak, F. et al. *The Control of Dividing Wall Column* (Centre for Process Integration, UMIST, Manchester, UK) Chemical Engineering Research & Design, Institution of Chemical Engineers (1993) 71 (A3) p. 307.

Triantafyllou, C. et al. *The Design and Optimisation of Fully Thermally Coupled Distillation Columns* Trans IChemE, vol. 70, Part A, Mar. 1992, pp. 118-132.

Halvorsen, I.J. et al. *Optimizing Control of Petlyuk Distillation: Understanding the Steady-State Behavior* Computers chem Engng, vol. 21, Suppl., pp. S249-S254, 1997.

Luyben, W.L. et al. *Profile Position Control of Distillation Columns with Sharp Temperature Profiles* AIChE Journal, vol. 18, No. 1, Jan. 1972 238-240.

Schulz, R.C. et al. *LAB Production* $2^{nd}$ World Conference on Detergents Montreux, Switzerland Oct. 5-10, 1986.

*Handbook of Petroleum Refining Processes* edited by Robert A. Meyers *McGraw-Hill, New York, $2^{nd}$ Ed.*, 1997 Chapters 1.5 and 5.2.

Nelson, W.L. *Petroleum Refinery Engineering* McGraw-Hill, New York, $1^{st}$ Ed. $4^{th}$ Impression, 1936, p. 442, fig. 141.

Watkins, R.N. *Petroleum Refinery Distillation* Gulf Publishing Company, Book Div., Houston, TX, $2^{nd}$ Ed. May 1981, pp. 101-103 and 114-115.

\* cited by examiner

DIVIDING WALL DISTILLATION COLUMN CONTROL APPARATUS

CROSS-REFERENCE TO RELATED APPLICATION

This application is a Continuation of U.S. application Ser. No. 09/793,250, filed on Feb. 26, 2001, now abandoned, which is incorporated herein by reference in its entirety.

FIELD OF THE INVENTION

This invention relates to the general field of process control as applied to distillation columns used in the petroleum, chemical, and petrochemical industries. This invention relates more specifically to a control apparatus and a control system for controlling a dividing wall distillation column used to perform the separation of two feed streams into three product streams. This invention is applicable to a process for producing alkylated aromatic compounds with removal of aromatic byproducts.

BACKGROUND OF THE INVENTION

Nearly forty years ago, it became apparent that household laundry detergents made of branched alkylbenzene sulfonates were gradually polluting rivers and lakes. Solution of the problem led to the manufacture of detergents made of linear alkylbenzene sulfonates (LABS), which were found to biodegrade more rapidly than the branched variety. Today, detergents made of LABS are manufactured worldwide.

LABS are manufactured from linear alkyl benzenes (LAB). The petrochemical industry produces LAB by dehydrogenating linear paraffins to linear olefins and then alkylating benzene with the linear olefins in the presence of HF or a solid alkylation catalyst. The linear paraffins are straight chain (unbranched) or normal paraffins. Normally, the linear paraffins are a mixture of linear paraffins having different carbon numbers. The linear paraffins have generally from about 6 to about 22, preferably from 10 to 15, and more preferably from 10 to 12 or from 11 to 13, carbon atoms per molecule.

LAB processes are described in the book edited by R. A. Meyers entitled "Handbook of Petroleum Refining Processes" (McGraw Hill, N.Y. 1986) and "Ullmann's Encyclopedia of Industrial Chemistry," Volumes A8 and A13, Fifth Edition (VCH, Weinheim, Germany). Flow schemes are illustrated in U.S. Pat. No. 3,484,498 issued to R. C. Berg, U.S. Pat. No. 3,494,971 issued to E. R. Fenske, U.S. Pat. No. 4,523,048 issued to Vora which teaches use of a selective diolefin hydrogenation zone, and U.S. Pat. No. 5,012,021 issued to B. Vora which teaches use of a selective monoolefin hydrogenation zone. Solid alkylation catalysts are illustrated in U.S. Pat. No. 3,201,487 issued to S. Kovach et al.; U.S. Pat. No. 4,358,628 issued to L. Slaugh; U.S. Pat. No. 4,489,213 issued to S. Kovach; and U.S. Pat. No. 4,673,679 issued to D. Farcasiu. Zeolitic solid alkylation catalysts are disclosed in U.S. Pat. Nos. 3,751,506; 4,387,259; and 4,409,412.

It is well known that aromatic byproducts are formed during the catalytic dehydrogenation of paraffins. For instance, the article starting at page 86 of the Jan. 26, 1970 issue of "Chemical Engineering" states that the product of the dehydrogenation of linear paraffins includes aromatic compounds. The nature of the particular aromatic byproducts that are formed in dehydrogenation is not essential to the operation of the alkylaromatic process. These aromatic byproducts are believed to include, for example, alkylated benzenes, dialkylated benzenes, naphthalenes, other polynuclear aromatics, diphenyl compounds, alkylated polynuclear hydrocarbons in the $C_{10}$–$C_{15}$ range, indanes, and tetralins, that is, they are aromatics of the same carbon number as the paraffin being dehydrogenated and may be viewed as aromatized normal paraffins. Some aromatic byproducts may be more detrimental than others in deactivating solid alkylation catalysts. It is believed that aromatic byproducts with few or small alkyl groups are more detrimental to solid alkylation catalysts than aromatic byproducts with multiple or long alkyl groups. It is also believed that aromatic byproducts having multiple aromatic rings are more detrimental to solid alkylation catalysts than aromatic byproducts having single aromatic rings. The particular side reactions that lead to the formation of the aromatic byproducts are also not essential to the operation of the alkylaromatic process. An illustration of some of the parallel thermal cracking reactions that can lead to the formation of aromatic byproducts is found in the diagram at the top of page 4–37 of the book mentioned above entitled "Handbook of Petroleum Refining Processes". Typically, from about 0.2 to about 0.7 weight percent, and generally to the extent of no more than 1 weight percent, of the feed paraffinic compounds to a dehydrogenation zone form aromatic byproducts. Although some commercially available dehydrogenation catalysts are more selective than others at minimizing the formation of aromatic byproducts, it is believed that these byproducts are formed at least to a small extent at suitable dehydrogenation conditions in the presence of most if not all commercially available dehydrogenation catalysts. Since it is an economic advantage to operate the dehydrogenation zone at conditions that produce a high conversion of the feed paraffinic compounds and a high yield of the desired olefins, these aromatic byproducts are produced at least to a small extent in most if not all commercial dehydrogenation zones. But, since these aromatic byproducts have the same number of carbon atoms as both the unconverted feed paraffins and the product olefins, they have boiling points close to that of these paraffins and olefins. Thus, using conventional distillation, the aromatic byproducts are difficult to separate from a mixture such as the dehydrogenation effluent which also contains these paraffins and olefins.

The aromatic byproducts from the dehydrogenation section enter the alkylation section. In the selective alkylation zone containing a solid alkylation catalyst, several possibilities can then occur. First, some of the aromatic byproducts deposit on the surface of the catalyst and as mentioned above deactivate the catalyst. Second, as mentioned above some of the aromatic byproducts are alkylated by monoolefins to form heavy alkylate. Each mole of heavy alkylate formed by this route represents the loss of two moles of feed paraffinic compound toward the production of a less-valuable product and reduces both dehydrogenation selectivity and alkylation selectivity. Third, some of the aromatic byproducts pass through the selective alkylation zone unreacted, are recovered with the overhead liquid stream of the paraffin column which is recycled to the dehydrogenation zone, and ultimately accumulate to unacceptable concentrations. In the prior art processes employing a solid alkylation catalyst, the concentration of aromatic byproducts in the stripping effluent stream can typically accumulate to 4–10 weight percent, which leads to rapid deactivation of solid alkylation catalyst. Where the alkylation catalyst is HF in the prior art processes, the concentration of aromatic byproducts in the stripping effluent stream can typically accumulate to 3–6 weight percent.

Processes for removing the aromatic byproducts that are formed during the catalytic dehydrogenation of paraffins are also known. Suitable aromatics removal zones may be selected from any processing methods which exhibit the primary requirement of selectivity for the aromatic byproducts. Suitable aromatics removal zones include, for example, sorptive separation zones and liquid—liquid extraction zones. See U.S. Pat. No. 5,276,231 and U.S. Pat. No. 5,334,793, the contents of each are incorporated herein by reference. Where the aromatics removal zone is a sorptive separation zone, a fixed bed or a moving bed sorbent system may be used, but the fixed bed system is more common. The sorbent usually comprises a particulate material. In a fixed bed system, the sorbent is typically installed in one or more vessels in a parallel flow arrangement, so that when the sorbent bed in one vessel is spent by the accumulation of the aromatic byproducts thereon, the spent vessel is bypassed while continuing uninterrupted operation through another vessel. A purge stream comprising a purge component, such as $C_5$ or $C_6$ paraffin (e.g., normal pentane), is passed through the spent sorbent bed in the bypassed vessel in order to purge or displace unsorbed components of the stream containing the aromatic byproducts from the void volume between particles of sorbent. After purging, a regenerant or desorbent stream comprising a desorbent component such as $C_6$ or $C_7$ aromatic (e.g., benzene), is passed through the sorbent bed in the bypassed vessel in order to desorb aromatic byproducts from the sorbent. Following regeneration, the sorbent bed in the bypassed vessel is again available for use in sorbing aromatic byproducts.

Thus, a sorptive separation zone for removing the aromatic byproducts typically produces three effluents, which approximately correspond to each of the three steps in the cycle of sorption, purge, and desorption. The composition of each of the three effluents changes during the course of each step. The first effluent, the sorption effluent, contains unsorbed components (i.e., paraffins and olefins) of the stream from which the aromatic byproducts are removed, and also typically contains the desorbent component. With its decreased amount of aromatic byproducts relative to the stream that is passed to the sorptive separation zone, this effluent is used further along in the process to produce alkylaromatics. For example, if the stream that passes to the sorptive separation zone is the dehydrogenation zone effluent, the sorption effluent contains monoolefins and paraffins and thus passes directly to the alkylation zone.

The second effluent, the purging effluent, contains the purge component, unsorbed components of the stream from which the aromatic byproducts were sorbed, and often the desorbent component. The third effluent is the desorption effluent, which contains the desorbent component, the aromatic byproducts, and the purge component. In the typical prior art process, the purging and desorption effluents are separated in two distillation columns. The desorption effluent passes to one column, which produces an overhead stream containing the desorbent and purge components a bottom stream containing the aromatic byproducts which is rejected from the process. The overhead stream of the first column and the purging effluent pass to a second column, which separates the entering hydrocarbons into an overhead stream containing the purge component and a bottom stream containing the desorbent component and unsorbed components of the stream from which the aromatic byproducts are removed. The overhead stream of the second column is used as the purge stream. The bottom stream of the second column is used in the process to produce alkylaromatics. In the example described above where the stream that passes to the sorptive separation zone is the dehydrogenation zone effluent, the bottom stream of the second column contains benzene, monoolefins, and paraffins and flows directly to the alkylation zone.

This two-column process for separating the purge and desorption effluents wastes energy. Energy is consumed to reboil the desorbent component (e.g., benzene) in the first column, to reboil the purge component (e.g., n-pentane) in the second column, and to heat the desorbent component in the second column. This process also has a high capital cost because two columns are needed. Thus, a process is sought in which the streams containing the aromatic byproducts, purge component, and desorbent component are produced in a more efficient manner that uses fewer utilities than the prior art two-column process.

Distillation columns have, of course, been widely used to perform many separations in industry. Over fifty years ago, Wright proposed replacing two distillation columns with a single distillation column having a vertical partition (dividing wall column) within the column that would effect the separation of the column feed into three constituent fractions. It was recognized then that a dividing wall column could minimize the size or cost of the equipment needed to produce overhead, bottoms, and sidedraw products. See U.S. Pat. No. 2,471,134 (Wright). Wright described using the dividing wall column to separate a mixture of methane, ethane, propane, butanes, and a small amount of $C_5$ and heavier hydrocarbons. Since then, researchers have studied the dividing wall column and have proposed using dividing wall columns for separating other mixtures, including xylenes (Int. Chem. Engg., Vol. 5, No. 3, July 1965, 555–561); butanes and butenes (See e.g., Trans IChemE, Vol. 70, Part A, March 1992, 118–132); methanol, isopropanol, and butanol (See e.g., Trans IChemE, Vol. 72, Part A, September 1994, 639–644); ethanol, propanol, and butanol (Ind. Eng. Chem. Res. 1995, 34, 2094–2103); air (See e.g., Ind. Eng. Chem. Res. 1996, 35, pages 1059–1071); natural gas liquids (Chem. Engg., July 1997, 72–76); and benzene, toluene, and ortho-xylene (Paper No. 34 K, by M. Serra et al., prepared for presentation at the AIChE Meeting, Los Angeles, Calif., USA, November 1997). The Serra et al. paper also describes separating mixtures of butanes and pentane; pentanes, hexane, and heptane; and propane and butanes.

Control systems for dividing wall distillation columns have been known since at least 1980, when U.S. Pat. No. 4,230,533 issued to Giroux describing a dividing wall distillation column and its control system. In the late 1990's, control systems for dividing wall distillation columns have been studied in further detail by researchers. For example, the separation of a ternary mixture consisting of methanol, iso-propanol, and butanol into three products using a dividing wall distillation column has been described in the article in Trans IChem, Vol. 76, Part A, March 1998, 319, by M. I. Abdul Mutalib et al. The article describes a control configuration in which the top reflux and the middle reflux are used as manipulated variables, while keeping the reboiler vapor constant. The article also mentions using temperatures above the top of the dividing wall, between the top and the bottom of the dividing wall, and below the bottom of the dividing wall for control purposes. According to the article, a Ph. D. thesis by M. I. Abdul Mutalib (UMIST, Manchester, UK, 1995) entitled "Operation and Control of the Dividing Wall Column" also describes such a configuration.

Despite the advantages of the dividing wall column and despite much research and study, the processing industry has long felt reluctant to use dividing wall columns in commercial processes. This widespread reluctance has been attributed to various concerns, including control problems, operational problems, complexity, simulation difficulties, and lack of design experience. See, for example, the articles by C. Triantafyllou and R. Smith in Trans IChemE, Vol. 70, Part A, March 1992, 118–132; F. Lestak and C. Collins in Chem. Engg., July 1997, 72–76; and G. Duennebier and C. Pantelides in Ind. Eng. Chem. Res. 1999, 38, 162–176. The article by Lestak and Collins sets forth some general guidelines and considerations when substituting a dividing wall column for conventional columns. Nevertheless, the literature documents relatively few practical uses of dividing wall columns in commercial plants. See the article by H. Rudd in The Chemical Engineer, Distillation Supplement, Aug. 27, 1992, s14–s15 and the article in European Chemical News, Oct. 2–8, 1995, 26.

Prior art alkylaromatic processes, in particular, do not use dividing wall distillation columns. Nor do they use fully or non-fully thermally coupled distillation columns, which, as explained in the above-mentioned article by C. Triantafyllou and R. Smith, are thermodynamically equivalent to dividing wall columns when there is no heat transfer across the dividing wall. In particular, a dividing wall distillation column has not been used for separating the effluent streams from a sorptive separation step in an alkylaromatic process. This is not only for the reasons given above but also for three additional reasons. First, the focus of prior research studies has been on separating relatively unchanging mixtures of only a few (e.g., 3 to 5) components, whereas the purging effluent contains dozens of compounds and its composition changes gradually yet significantly from the start to the end of the purging step. In addition, the desorbent effluent likewise contains dozens of compounds, and its composition also changes to a significant extent over the course of the desorption step. Second, the research studies produce dividing wall distillation product streams in which co-boiling components are recovered in the same stream, whereas the separation of the purging and desorption effluents preferably produces the aromatic byproducts in one stream, so that they can be rejected from the process, and the monoolefins and paraffins in another stream for further use in the process. Third, achieving a commercially-useful long life of the solid alkylation catalysts used for the production of LAB requires that the composition of the stream containing the desorbent component be controlled relatively tightly, since the presence of aromatic byproducts in this stream tends to rapidly deactivate solid alkylation catalysts. Thus, alkylaromatic processes are characterized by changing compositions of the purging and desorbent effluents, unique requirements for the separation of co-boiling compounds, and a relatively tight specification on the aromatic byproducts in the stream containing the desorbent compounds. This combination compounds the problems, difficulties, and complexity of using a dividing wall distillation column or two thermally coupled distillation columns. In addition, in order for any such distillation column arrangement to be adopted commercially by the processing industry, a dependable control system is required.

SUMMARY OF THE INVENTION

This invention is an apparatus for controlling the separation in a dividing wall distillation column of at least two feeds into at least three products. The apparatus uses a temperature measuring device to measure the temperature of fluid in the column, a controller, and a means for adjusting the temperature of fluid in the column. The temperature measuring device may be on either side of the dividing wall or above or below the dividing wall, and more than one such device may be used. The means for adjusting the temperature may include a means for adjusting the heat input to or heat removal from the column, such as regulating the reboiler duty or regulating the reflux flow. One of the feeds comprises a low-boiling component and a select high-boiling component, and another feed comprises a mid-boiling component and a reject high-boiling component. The products are a light stream comprising the low boiling component, a sidedraw stream comprising the mid-boiling component and the select high-boiling component, and a heavy stream comprising the reject high-boiling component. This invention is also a method for controlling the separation of at least two feeds into at least three products in a dividing wall distillation column.

This invention is applicable to a process for the production of alkylaromatic hydrocarbons by alkylating feed aromatic hydrocarbons with olefinic hydrocarbons. More specifically, this invention is applicable to a process where both olefinic hydrocarbons and aromatic byproducts are produced by dehydrogenating paraffinic hydrocarbons, and where the aromatic byproducts are removed using a aromatic byproducts removal zone and either a dividing wall distillation column or two thermally coupled distillation columns. It has now been recognized that this invention permits the use of two thermally coupled distillation columns or of a dividing wall distillation column to reject the aromatic byproducts in a manner that is stable and controllable for commercial alkylaromatic production, despite the changing compositions of the effluents produced by the aromatic byproducts removal zone, unique requirements for the separation of the aromatic byproducts and the paraffinic hydrocarbons, and a relatively tight specification on the aromatic byproducts in the stream containing the desorbent compounds. As between a single dividing wall distillation column on the one hand and two fully thermally coupled distillation columns on the other hand, the former is preferred when the cost of a single distillation vessel represents a significant savings over that of two distillation vessels.

Accordingly, in a broad embodiment, this invention is an apparatus for controlling separation in a dividing wall distillation column. The separation is of a first stream comprising a low-boiling component and a select high-boiling component and a second stream comprising a mid-boiling component and a reject high-boiling component. The separation produces a light stream comprising the low boiling component, a sidedraw stream comprising the mid-boiling component and the select high-boiling component, and a heavy stream comprising the reject high-boiling component. The column has a shell defining a middle vapor-liquid contacting area containing at least one vertically oriented partition dividing the middle vapor-liquid contacting area into at least a feed section and a sidedraw section. The feed section is defined by the shell and the partition, and the sidedraw section is defined by the shell and the partition. The shell also defines an upper vapor-liquid contacting area above and in communication with the middle vapor-liquid contacting area. In addition, the shell defines a lower vapor-liquid contacting area below and in communication with the middle vapor-liquid contacting area. The column has a first inlet port in communication with the upper vapor-liquid contacting area to introduce the first stream to the upper vapor-liquid contacting area. The column also has a second inlet port in communication with the feed section to introduce the second feed stream to the feed section. In addition, the column has a first outlet port in communication with the sidedraw section to withdraw liquid from the sidedraw section. The column is maintained at distillation conditions. The apparatus comprises a first temperature measuring device operably connected to the column to measure the temperature of fluid in the column and to establish a first temperature signal representative of the temperature of fluid in the column. The apparatus also comprises a first controller to receive a first controller input signal responsive to the first temperature signal, to compare the first controller input signal to a first set point, and to establish a first controller output signal responsive to the difference between the first controller input signal and the first set point. In addition, the apparatus comprises a first means for adjusting the temperature of fluid in the column, the means being responsive to the first controller output signal.

Other embodiments of the invention are set forth in the detailed description of the invention.

INFORMATION DISCLOSURE

Figure 1:
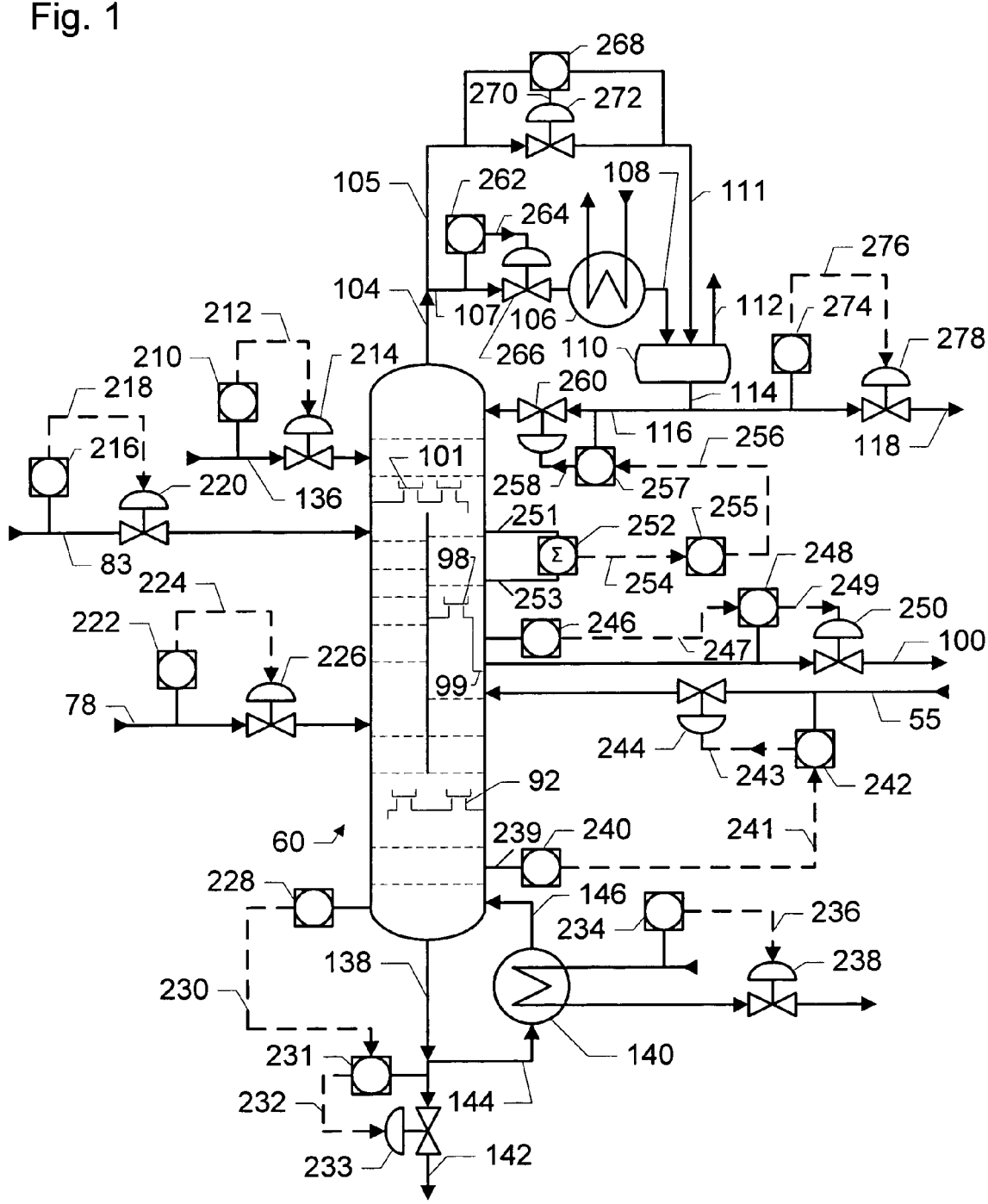
FIGS. 1–2 each show an embodiment of the invention.

U.S. Pat. No. 2,471,134 (Wright) discloses a dividing wall distillation column.

U.S. Pat. No. 4,230,533 (Giroux) discloses a fractionation method and apparatus for separating a feed stream into three product streams, and describes regulating the flow rate of reflux to the column using a valve, a flow recorder, and a level controller.

The article in Computers chem. Engng, Vol. 21, Suppl., S249, 1997, by I. J. Halvorsen et al., points out the control difficulties and the steady-state behavior of dividing wall distillation columns and fully thermally coupled distillation columns in separating a single feed stream into three product streams.

The article in Trans IChemE, Vol. 70, Part A, March 1992, 118, by C. Triantafyllou et al., explains that a dividing wall distillation column is thermodynamically equivalent to a fully thermally coupled distillation column, provided that there is no heat transfer across the dividing wall.

The article at Chem. Eng. Res. Des. (1993), 71 (A3), 307, by F. Lestak et al., describes the results of an analysis of the degrees of freedom and of the relative gain array of a dividing wall distillation column for separating a single ternary mixture into three pure products.

The article in Trans IChemE, Vol. 76, Part A, March 1998, 308, by M. I. Abdul Mutalib et al., describes the degrees of freedom and the dynamic simulation of dividing wall distillation columns used for the separation of a ternary mixture consisting of methanol, iso-propanol, and butanol into three products. The article considers one control scheme in which the top reflux is manipulated by the distillate flow composition and another control scheme in which the top reflux is manipulated by the top accumulator level.

The article in Trans IChem, Vol. 76, Part A, March 1998, 319, by M. I. Abdul Mutalib et al., describes using a dividing wall distillation column for the separation of a ternary mixture consisting of methanol, iso-propanol, and butanol into three products. The article mentions a control configuration in which the top reflux and the middle reflux are used as manipulated variables, while keeping the reboiler vapor constant. The article also mentions using temperatures above the top of the dividing wall, between the top and the bottom of the dividing wall, and below the bottom of the dividing wall for control purposes. According to this article, a Ph.D. thesis by M. I. Abdul Mutalib (UMIST, Manchester, UK, 1995) entitled "Operation and Control of the Dividing Wall Column" also describes such a configuration.

U.S. Pat. No. 2,725,351 (Grote) describes a fractionation control system in which a plurality of vertically spaced temperature sensitive indicators are connected in parallel with a controller to effect an arithmetic average of different temperatures, thus providing an averaging effect on the controller.

The article in AIChE Journal, Vol. 18, No. 1, 238, January 1972, by W. L. Luyben et al. describes profile position control of distillation columns. The article describes using resistance bulbs or thermocouples hooked up in series or in parallel to give an average temperature signal that is essentially equivalent to profile position. Alternatively, the article suggests that signals (pneumatic or electronic) from several temperature transmitters could be averaged in adding relays.

The paper entitled *LAB Production*, by R. C. Schulz, P. R. Pujado, and B. V. Vora, presented at the $2^{nd}$ World Conference on Detergents, held at Montreux, Switzerland, during Oct. 5–10, 1986, describes an LAB process wherein feed treatment of the kerosene consists of prefractionation using a stripper and a rerun column followed by hydrotreating of the kerosene heartcut. The teachings of the Schulz et al. article are incorporated herein by reference. LAB processes are further described in the book edited by Robert A. Meyers entitled *Handbook of Petroleum Refining Processes*, (McGraw-Hill, New York, Second Edition, 1997) at Chapter 1.5, the teachings of which are incorporated herein by reference. Paraffin dehydrogenation processes are described in the Meyers book in Chapter 5.2, the teachings of which are incorporated herein by reference.

U.S. Pat. No. 4,587,370 (DeGraff) discloses a fractionation method that uses three fractionation columns employed in series for recovering product alkylaromatics produced by alkylation of feed aromatics. The overhead stream of the second column contains the product alkylaromatics and is employed as the heat source for the reboiler of the first column, which recycles feed aromatics to the alkylation reactor.

U.S. Pat. No. 5,276,231 (Kocal et al.) discloses a process for producing alkylated aromatic compounds by paraffin dehydrogenation and aromatic alkylation wherein aromatic byproducts formed in paraffin dehydrogenation are selectively removed using at least one aromatics removal zone.

U.S. Pat. No. 5,334,793 (Kocal) discloses a process for increasing catalyst life and improving product linearity in the alkylation of aromatics with linear olefins comprising decreasing the concentration in the alkylation feedstock of aromatic compounds formed in the dehydrogenation step.

U.S. Pat. No. 6,069,285 (Fritsch et al.) discloses an integrated alkylaromatic process using a solid alkylation catalyst and an aromatic rectifier that uses an aromatic byproducts removal zone.

The book entitled "Petroleum Refinery Engineering," written by W. L. Nelson, and published by McGraw-Hill Book Company, Inc., New York, First Edition, Fourth Impression, 1936, page 442, FIG. 141, shows a method of removing reflux heat using circulating reflux.

The book entitled, "Petroleum Refinery Distillation," written by R. N. Watkins, and published by Gulf Publishing Company, Book Division, Houston, Tex., Second Edition, May, 1981, pages 101–103 and 114–115, describes vacuum towers with pumpback and pumparound reflux heat removal.

DETAILED DESCRIPTION

This invention is useful in a process for controlling the separation in a dividing wall distillation column of two feed streams. The first feed stream comprises a low-boiling component and a select high-boiling component, and the second feed stream comprises a mid-boiling component and a reject high-boiling component. The separation produces a light stream comprising the low boiling component, a sidedraw stream comprising the mid-boiling component and the select high-boiling component, and a heavy stream comprising the reject high-boiling component. Although this invention can be used for many different separations, it is believed that one of the more common uses of this invention is in an alkylaromatic process which uses a sorptive separation zone to remove aromatic byproducts and which produces a purging effluent and a desorption effluent. Usually, in such an process, the low-boiling component comprises the purge component, and the mid-boiling component is the desorbent component. Also, the select high-boiling component usually comprises the unsorbed components (i.e., paraffins and olefins) that were in the stream from which the aromatic byproducts are removed, and which are purged from the sorptive separation zone by the purging effluent, and the reject high-boiling component comprises the aromatic byproducts. So, in the detailed description that follows, this invention will be described in terms of such an alkylaromatic process. However, it is not intended that this description limit the invention as set forth in the claims.

We shall first describe a typical process for the production of alkylated aromatic compounds without the removal of aromatic byproducts as currently and previously practiced along with some common variants of particular interest. We shall then describe how an aromatic byproducts removal zone may be incorporated into this typical process in order to properly set the stage upon which our invention is practiced and to emphasize that the success of our invention is not dependent upon the particular variant of the prior art used. We shall then describe the improvement which is our invention where it will become clear that its success is independent of the details of the prior art processes in which it is embedded.

The two feed compounds consumed in the alkylaromatic process are a paraffinic and an aromatic compound. The paraffinic feed is preferably a straight chain (unbranched) or normal paraffin having from 6 to 22 carbon atoms per molecule. A better quality detergent precursor normally results from the use in the selective alkylation zone of an olefin having from about 10 to 15 carbon atoms per molecule. Therefore, a preferred paraffinic feed is a $C_{10}$ to $C_{15}$ paraffin or a $C_{10}$-plus linear paraffin. The paraffinic feed is normally a mixture of paraffins having different carbon numbers. A preferred method for the production of the paraffinic feed is the recovery of straight chain hydrocarbons from a hydrotreated kerosene boiling range petroleum fraction by extraction or by adsorptive separation. Suitable paraffinic feeds include $C_{10}$–$C_{22}$ linear paraffins, $C_{10}$–$C_{15}$ linear paraffins, and $C_{15}$–$C_{20}$ linear paraffins. In other applications of the subject process, the preferred paraffinic feed is a mixture of branched chain paraffinic compounds. These branched chain paraffinic feeds can be obtained by extraction, by adsorptive separation, or by suitable oligomerization and treatment processes. The aromatic feed which is alkylated in the subject process is preferably benzene, but the aromatic feed may also be of a higher molecular weight, such as toluene, a xylene, ethylbenzene, phenol, naphthalene, etc.

For purposes of discussion, the typical process may be divided into a dehydrogenation section and an alkylation section. The dehydrogenation section will preferably be configured substantially in the following manner. A feed stream containing paraffins combines with recycled hydrogen and recycled unreacted paraffins from the alkylation section. This forms a reactant stream which is heated and passed through a bed of a suitable catalyst maintained at the proper dehydrogenation conditions of temperature, pressure, etc. The effluent of this catalyst bed or reactor effluent stream is usually cooled, partially condensed, and passed to a vapor-liquid or product separator. The condensed material, referred to herein as the dehydrogenated product stream, is passed to a stripping separation zone which usually includes a stripping column that removes all compounds which are more volatile than the lightest normal hydrocarbon which it is desired to charge to the alkylation section of the process. The stripping column produces a net bottoms stream referred to herein as the stripping effluent stream.

Dehydrogenation catalysts are well known in the prior art as exemplified by U.S. Pat. Nos. 3,274,287; 3,315,007; 3,315,008; 3,745,112; and 4,430,517. What is important is that catalysts for dehydrogenation are well known to those skilled in the dehydrogenation art and need not be described here in great detail. The nature of the dehydrogenation catalyst is not critical to the successful operation of the alkylaromatic process and is largely a matter of choice to be made by the practitioner.

The stripping effluent stream is passed to an alkylation section which comprises a selective alkylation zone and a distillation or alkylate recovery zone. In the selective alkylation zone, linear olefins in the stripping effluent stream react with a feed stream containing an aromatic which is generally benzene to produce a selective alkylation zone effluent stream containing linear alkylbenzene. The selective alkylation zone can have a number of different configurations and reactor vessels depending on whether the catalyst is HF or a solid alkylation catalyst. Solid alkylation catalysts typically are characterized as having an acid function and are, therefore, better known as solid acid catalysts. Such solid acid catalysts include, but are not limited to, materials such as amorphous silica-alumina, crystalline aluminosilicate materials such as zeolites and molecular sieves, naturally occurring and man-made clays including pillared clays, sulfated oxides such as sulfonated zirconia, traditional Friedel-Crafts catalysts such as aluminum chloride and zinc chloride, and solid Lewis acids generally. Again, what is important is that processes and catalysts for alkylation are well known to those skilled in the alkylation art and need not be described here in great detail. It is important to emphasize that the nature of the alkylation process and catalyst is not critical to the successful operation of the alkylaromatic process and is largely a matter of choice to be made by the practitioner.

The selective alkylation zone produces a selective alkylation zone effluent that enters separation facilities for the recovery of products and recyclable feed compounds. Suitable distillation facilities for such separations which are well known by those skilled in the art and can be tailored as desired to provide specific fractions and purities are described in U.S. Pat. Nos. 3,950,448; 4,237,327; 4,237,328; and 5,012,021. In one commonly employed arrangement, the bottoms stream of the HF stripping column where the alkylation catalyst is HF, or the selective alkylation zone effluent stream where the alkylation catalyst is a solid alkylation catalyst, passes into a benzene column which produces an overhead stream containing benzene and a bottoms stream containing the alkylate product. This bottoms stream passes into a paraffin column which produces an overhead liquid stream containing unreacted paraffins, which normally is recycled as a recycle stream to the dehydrogenation zone, and a bottoms stream containing the product alkylate and any higher molecular weight side product hydrocarbons formed in the selective alkylation zone. This bottoms stream is passed into a rerun column which produces an overhead alkylate product stream containing the detergent alkylate and a bottoms stream containing polymerized olefins and polyalkylated benzenes (heavy alkylate).

A common variant of the subject process includes the selective hydrogenation of diolefins that are normally present in the dehydrogenated product stream or the stripping effluent stream. It is well known that diolefins are formed during the catalytic dehydrogenation of paraffins. Selective diolefin hydrogenation converts the diolefins to monoolefins, which are the desired product of the dehydrogenation section, and produces a selective diolefin hydrogenation product stream.

Another common variant of the subject process includes the selective hydrogenation of monoolefins that are normally present in the overhead liquid stream of the paraffin column. It is well known that unreacted monoolefins from the selective alkylation zone are present in the overhead liquid stream, and that these monoolefins shorten the life of currently available dehydrogenation catalysts where the overhead liquid stream is recycled to the dehydrogenation zone. Selective monoolefin hydrogenation converts the monoolefins to paraffins, which are the desired feed compound of the dehydrogenation section, and produces a selective monoolefin hydrogenation product stream.

We shall now describe the incorporation of an aromatic byproducts removal zone into this typical dehydrogenation alkylation process. The aromatics byproducts removal zone eliminates or significantly reduces the aromatic byproducts in the feedstock to the selective alkylation zone in the prior art processes for the production of alkylated aromatic compounds. It reduces the deactivation rate of solid alkylation catalyst and, thereby, produces a significantly higher yield of linear alkylated aromatic compounds.

The aromatic byproducts removal zone selectively removes at least a portion of the aromatic byproducts in the dehydrogenated product stream using at least one aromatics removal zone. An aromatics removal zone may be placed in one or more locations in the process. The aromatic byproducts may be selectively removed from the dehydrogenated product stream and the stripping effluent stream. Also, where the subject process includes a selective diolefin hydrogenation zone, the aromatic byproducts may be selectively removed from the selective diolefin hydrogenation product stream. The aromatics removal zone is preferably located between the dehydrogenation zone and the selective alkylation zone because the aromatic byproducts are preferably selectively removed prior to entering the selective alkylation zone. These locations set forth above are not necessarily equivalent in terms of the required equipment, such as heaters, heat exchangers, vessels, coolers, and etc., to practice the process. Those skilled in the art of hydrocarbon processing are able to design and provide the required equipment.

Suitable aromatics removal zones may be selected from any processing methods which exhibit the primary requirement of selectivity for the aromatic byproducts. Suitable aromatics removal zones include, for example, sorptive separation zones and liquid—liquid extraction zones. However, it should be recognized that a particular aromatics removal zone may give better results than another zone. The preferred aromatics removal zone for use in the alkylaromatic process is a sorptive separation zone.

Where the aromatics removal zone is a sorptive separation zone, the removal of aromatic byproducts can be practiced in fixed bed or moving sorbent bed systems, but the fixed bed system is preferred. The sorbent may be installed in one or more vessels and in either series or parallel flow. The flow of the stream containing the aromatic byproducts through the sorptive separation zones is preferably performed in a parallel manner so that when one of the sorbent beds or chambers is spent by the accumulation of the aromatic byproducts thereon, the spent zone may be bypassed while continuing uninterrupted operation through the parallel zone. The spent zone of sorbent may then be regenerated or the spent sorbent may be replaced as desired.

The aromatic byproducts removal zone may also be practiced in a cocurrent, pulsed batch process, like that described in U.S. Pat. No. 4,159,284 or in a cocurrent, pulsed continuous process, like that disclosed in U.S. Pat. Nos. 4,402,832 and 4,478,721, both issued to Gerhold.

The aromatic byproducts removal zone may also be practiced in a countercurrent simulated moving bed system, such as described in U.S. Pat. No. 2,985,589 issued to Broughton. Cyclic advancement of the input and output streams can be accomplished by manifolding systems, which are also known, e.g., by rotary disc valves shown in U.S. Pat. Nos. 3,040,777 and 3,422,848. Equipment utilizing these principles are familiar, in sizes ranging from pilot plant scale, such as described in U.S. Pat. No. 3,706,812 issued to deRosset, to commercial scale in flow rates from a few cc per hour to many thousands of gallons per hour.

Suitable sorbents may be selected from materials which exhibit the primary requirement of selectivity for the aromatic byproducts and which are otherwise convenient to use. Suitable sorbents include, for example, molecular sieves, silica, activated carbon, activated charcoal, activated alumina, silica-alumina, clay, cellulose acetate, synthetic magnesium silicate, macroporous magnesium silicate, and/or macroporous polystyrene gel. It should be understood that the above-mentioned sorbents are not necessarily equivalent in their effectiveness. The choice of sorbent will depend on several considerations including the capacity of the sorbent to retain aromatic byproducts, the selectivity of the sorbent to retain the aromatic byproducts which are more detrimental to solid alkylation catalysts, and the cost of the sorbent. The preferred sorbent is a molecular sieve, and the preferred molecular sieve is 13X zeolite (sodium zeolite X). Detailed descriptions of zeolites may be found in the book authored by D. W. Breck entitled "Zeolite Molecular Sieves" published by John Wiley and Sons, New York, in 1974.

Those skilled in the art are able to select the appropriate conditions for operation of the sorbent without undue experimentation. For example, a fixed bed sorptive separation zone containing 13X zeolite may be maintained at a temperature from about 20° C. to about 300° C. and preferably from about 100° C. to about 200° C., a pressure effective to maintain the stream containing the aromatic byproducts in a liquid phase at the chosen temperature, and a liquid hourly space velocity from about 1 $hr^{-1}$ to about 10 $hr^{-1}$ and preferably from about 1 $hr^{-1}$ to about 3 $hr^{-1}$. The flow of the stream containing the aromatic byproducts through the sorptive separation zone may be conducted in an upflow, downflow or radial-flow manner.

Although both liquid and vapor phase operations can be used in many sorptive separation processes, liquid phase operation is preferred for the sorptive separation zone because of the lower temperature requirements and because of the higher sorption yields of the aromatic byproducts that can be obtained with liquid phase operation over those obtained with vapor phase operation. Therefore, the temperature and pressure of the sorptive separation zone during sorption of the aromatic byproducts are preferably selected to maintain in a liquid phase the stream from which the aromatic byproducts are selectively removed. Alternatively, the temperature and pressure of the sorptive separation zone during sorption of the aromatic byproducts can be selected to maintain in a liquid phase the aromatic byproducts in the stream from which the aromatic byproducts are selectively removed. Mixed phases (i.e., a combination of a liquid phase and a vapor phase) for the stream from which the aromatic byproducts are separated are generally not preferred because of the well-known difficulties involved in maintaining uniform flow distribution of both a liquid phase and a vapor phase through a sorptive separation zone. The operating conditions of a sorptive separation zone can be optimized by those skilled in the art to operate over wide ranges, which are expected to include the conditions in the reaction zones and its variants. Therefore, a sorptive separation zone may be contained in a common reaction vessel with the dehydrogenation zone, the selective diolefin hydrogenation zone, or the selective alkylation zone.

In general, during normal processing (i.e., during the sorption step), the effluent stream withdrawn from the aromatic byproducts removal zone has a lower molar ratio of aromatic byproducts per monoolefin, based on the total monoolefins in the effluent stream, than the molar ratio of aromatic byproducts per monoolefin of the stream from which the aromatic byproducts are removed, based on the total monoolefins in the stream which is passed to the aromatic byproducts removal zone. During the sorption step, the effluent stream's molar ratio of aromatic byproducts per monoolefin, based on the total monoolefins in the effluent stream, is generally less than 50%, preferably less than 20%, and more preferably less than 1%, of the molar ratio of aromatic byproducts per monoolefin of the stream which is passed to the aromatic byproducts removal zone, based on the total monoolefins in the stream which is passed to the aromatic byproducts removal zone. During sorption, the molar ratio of aromatic byproducts per monoolefin, based on the total monoolefins in the effluent stream, of the effluent stream is generally less than 0.2, and may be even lower.

Following an appropriate processing period, which will depend on the composition of the stream containing the aromatic byproducts and the particular aromatic byproducts themselves, it is usually necessary to regenerate the sorbent, that is to remove or desorb the sorbed aromatic byproducts from the sorbent so that the sorbent may be reused.

It should be understood that, prior to desorption or regeneration, it is also preferred to purge or displace from the void volume of the sorbent bed the unsorbed components of the stream from which the aromatic byproducts were removed. This is preferred because, when the aromatic byproducts are desorbed from the sorbent, they enter the void volume in the sorbent bed. If, at that time, that void volume contains unsorbed components, then desorption would have the adverse effect of re-contaminating the unsorbed components in the void volume with aromatic byproducts that are being desorbed. Clearly, this would be counter-productive and undesirable, since in effect it would partially undo some of the removal of aromatic byproducts that had been accomplished in the sorption step. Furthermore, the resulting contaminated mixture in the pore volume of the sorbent bed would not be readily separable by distillation, since the aromatic byproducts have boiling points in the same range as those of the unsorbed components in the void volume of the bed.

There are numerous methods of purging the sorbent bed. It is not intended to limit the purging to any particular method of purging the sorbent. Suitable purging methods include contacting the sorbent with a liquid, or with a vapor or gas, or with a mixture of a liquid and a vapor or gas, to displace or purge the unsorbed components from the sorbent. Suitable liquids may be selected from materials which exhibit the primary requirement of displacing or purging the unsorbed components from the sorbent without desorbing sorbed aromatic byproducts to an undesirable extent, and which are otherwise convenient to use. Suitable liquids include, for example, lighter paraffins and olefins, including $C_4$ to $C_9$ paraffins and olefins, preferably $C_5$ to $C_7$ paraffins and olefins, and more preferably $C_4$ to $C_6$ paraffins and olefins, and mixtures thereof. Suitable combinations of vapors or gases and liquids include a hydrogen-containing gas or vapor and a pentane-containing liquid. In a preferred method of regeneration, liquid n-pentane may be used.

Those skilled in the art are able to select the appropriate conditions for purging the sorbent without undue experimentation. For example, a fixed bed sorptive separation zone containing 13 X zeolite may be purged using a purge stream of 100 vol-% liquid n-pentane at purging conditions including a temperature from about 20° C. to about 300° C. and preferably from about 100° C. to about 200° C., a pressure of from atmospheric pressure to a pressure effective to maintain the n-pentane in a liquid phase at the chosen temperature, and a liquid hourly space velocity from about 1 $hr^{-1}$ to about 10 $hr^{-1}$ and preferably from about 1 $hr^{-1}$ to about 3 $hr^{-1}$. The flow direction of the purge stream through the sorptive separation zone may be upflow or radial flow, but the preferred direction is downflow. Relative to the flow direction of the stream passing through the sorbent bed during normal processing, the flow direction of the purging stream is preferably in the same direction, but it may be in any other direction, such as the opposite direction.

The purging step produces a purging effluent, whose composition usually changes during the course of the purging step as more and more of the unsorbed components are purged or displaced from the void volume of the sorbent bed. In a common arrangement, the sorbent bed is an elongated bed, the purge stream is introduced at one end of the sorbent bed, the purging effluent is withdrawn from an opposite or otherwise remote end of the bed, and the purge stream passes through the sorbent bed in a plug-flow manner from the inlet end to the outlet end. At the start of the purging step with this arrangement, the purging effluent contains mainly the unsorbed components, but at the end of the purging step the purging effluent contains mainly the components of the purge stream. Depending on the extent of backmixing within the sorbent bed during the purging step, this transition in the composition of the purging effluent may occur over a very short period of time or it may take place in a gradual, progressive fashion over the course of the purging step.

After the sorbent bed is purged, the sorbent bed is regenerated. There are numerous methods of regenerating the sorbent, which is also referred to herein as desorption. It is not intended to limit the regeneration to any particular method of regenerating the sorbent. Suitable desorption methods include contacting the sorbent with a liquid, or with a vapor or gas, or with a mixture of a liquid and a vapor or gas, to displace or desorb the sorbed aromatic byproducts from the sorbent. Suitable liquids may be selected from materials which exhibit the primary requirement of displacing the aromatic byproducts from the sorbent and which are otherwise convenient to use. Suitable liquids include, for example, lighter (e.g., $C_6$–$C_8$) aromatics hydrocarbons including benzene and/or lighter paraffins and olefins, including $C_6$ to $C_9$ paraffins and olefins, and mixtures thereof. Suitable combinations of vapors or gases and liquids include a hydrogen-containing gas or vapor and a benzene-containing liquid. In a preferred method of regeneration, liquid benzene may be used.

Those skilled in the art are able to select the appropriate conditions for regeneration of the sorbent without undue experimentation. For example, a fixed bed sorptive separation zone containing 13 X zeolite may be regenerated using a desorbent stream of 100 vol-% liquid benzene at regeneration conditions including a temperature from about 20° C. to about 300° C. and preferably from about 100° C. to about 200° C., a pressure of from atmospheric pressure to a pressure effective to maintain the n-pentane in a liquid phase at the chosen temperature, and a liquid hourly space velocity from about 1 $hr^{-1}$ to about 10 $hr^{-1}$ and preferably from about 1 $hr^{-1}$ to about 3 $hr^{-1}$. The flow direction of the desorbent stream through the sorptive separation zone may be upflow or radial flow, but the preferred direction is downflow. Relative to the flow direction of the stream passing through the sorbent bed during normal processing, the flow direction of the desorbent stream is preferably in the same direction, but it may be in any other direction, such as the opposite direction.

The regeneration or desorption step produces a desorption effluent, whose composition usually changes during the course of the desorption step as more and more of the aromatic byproducts are removed or desorbed from the sorbent bed. In the arrangement described above of an elongated sorbent bed, at the start of the desorption step, the desorption effluent contains mainly the components of the purge stream, but at the end of the desorption step the purging effluent contains mainly the components of the desorbent stream. During the desorption step, the concentration of the aromatic byproducts in the desorption effluent varies, depending on how readily they are desorbed from the sorbent. For example, the concentration of aromatic byproducts in the desorption effluent may be low or nil at the start of desorption step, rise up to a peak or maximum during the middle of desorption when aromatic byproducts are being desorbed from a large portion of the sorbent bed, and drop down again at the end of the desorption step once most of the aromatic byproducts have been desorbed. Also, the composition of the desorption effluent may vary depending on the extent of backmixing within the sorbent bed during the desorption step.

Following the desorption period, the bed is usually in a suitable condition for reuse for sorbing aromatic byproducts from the stream that is normally being processed, such as the dehydrogenated product stream. However, it should be understood that in certain methods of regeneration it may also be necessary to remove the regenerating or desorbing medium from the sorbent before normal processing.

While the purging effluent usually contains unsorbed components of the stream from which the aromatic byproducts are removed, especially at the start of the purge step, the desorption effluent may contain none of these components. As more of the unsorbed components are displaced from the void volume in the sorbent bed during the purge step, less unsorbed components remain in the void volume at the start of the desorption or regeneration step. Thus, if the extent of purging of the unsorbed components from the void volume is substantially completed during the purge step, then little or no additional unsorbed components will be purged from the void volume when the desorbent stream is introduced. In that case, even at the start of the desorption step, the desorption effluent will contain very little of the unsorbed components. On the other hand, if the extent of purging of the void volume during the purge step is relatively slight, then the desorption effluent will contain relatively more of the unsorbed components. Thus, the concentration and quantity of unsorbed components in the desorption effluent depends on the extent of purging during the purge step. That extent of purging, in turn, is determined by balancing the cost of performing an extended or more complete purge with the benefit of recovering the unsorbed components in the purging effluent rather than in the desorption effluent. As will be illustrated hereinafter, essentially all of the unsorbed components that are recovered in the purging effluent are capable of being used productively to produce alkylaromatic product, since these unsorbed components are recovered in the sidedraw stream of the dividing wall distillation column and thus pass to the selective alkylation zone. On the other hand, essentially all of the unsorbed components that are recovered in the desorption effluent are lost from the process, since they are recovered in the bottom stream of the dividing wall distillation column and thus are rejected with the aromatic byproducts. A person of ordinary skill in the art can compute the benefits and costs of extending the purge step in order optimize the recovery of the unsorbed components.

The streams separated in the dividing wall distillation column that may be used with this invention are the purging effluent and the desorption effluent. The purging effluent is preferably a liquid phase mixture, but may be a two-phase, vapor-liquid mixture comprising from about 0 to about 70 mol-% vapor phase. The temperature of the purging effluent is generally from about 100 to about 275° F. (38 to 135° C.), and preferably from about 175 to about 185° F. (79 to 85° C.). The desorption effluent is also preferably a liquid phase mixture, but may be a two-phase, vapor-liquid mixture comprising from about 0 to about 20 mol-% vapor phase. The temperature of the desorption effluent is generally from about 200 to about 250° F. (93 to 121° C.), and preferably from about 230 to about 240° F. (110 to 115° C.).

The description that follows is written in terms of fractionating a purging effluent and a desorption effluent into a light or overhead stream comprising the purge component, a sidedraw or product stream comprising the desorbent component, and a heavy or bottom stream comprising the aromatic byproducts. The purge component generally has a lower boiling point than the desorbent component and typically contains at least one fewer carbon atom than the desorbent component. The aromatic byproducts generally have a higher boiling point than the desorbent component and typically contain at least four more carbon atoms than the desorbent component. The arrangement of the dividing wall distillation column and any associated equipment and its operating conditions (e.g., temperatures and vapor/liquid ratios) in the description that follows will be those generally associated with accomplishing such a separation in accordance with this invention, and are not intended to limit the scope of the invention as set forth in the claims.

The present invention is applicable to a wide variety of alkylaromatic processes using a dehydrogenation zone, a selective alkylation zone, and a sorptive aromatic byproducts removal zone, but the most widely practiced alkylaromatic process to which the present invention is applicable is one in which the paraffinic feed is $C_{10}$ to $C_{15}$ paraffin, the aromatic feed is benzene, the purge compound for purging the void volume of the sorbent beds in the aromatic byproducts removal zone is n-pentane, and the desorbent compound for desorbing or removing aromatic byproducts from the sorbent beds in the aromatic byproducts removal zone is benzene. Thus, a common example of a separation that can be accomplished using the subject invention is the separation of a purge stream comprising n-pentane and $C_{10}$ to $C_{15}$ paraffinic and olefinic hydrocarbons and a desorbent stream comprising benzene, aromatic byproducts, and pentane into a light stream comprising n-pentane, a sidedraw stream comprising benzene and $C_{10}$ to $C_{15}$ paraffinic and olefinic hydrocarbons, and a heavy stream comprising aromatic byproducts having from 10 to 15 carbon atoms. In this typical separation, the unsorbed components of the stream from which the aromatic byproducts are removed comprise $C_{10}$ to $C_{15}$ paraffins and olefins. The discussion of the invention described herein will be in reference to its application to this common separation. It is not intended that such discussion limit the scope of the invention as set forth in the claims.

Despite fluctuations in the compositions of the purging and desorbent effluents, unique requirements for the separation of co-boiling compounds into the sidedraw stream and the bottom stream, and a relatively tight specification on the aromatic byproducts in the sidedraw stream containing the desorbent compounds, it has now been recognized that, when producing LAB using an aromatic byproducts removal zone downstream of the dehydrogenation zone and upstream of the selective alkylation zone, two fully or non-fully thermally coupled distillation columns or a dividing wall distillation column is suitable for producing the desired fractions. Since the capital cost of a single new dividing wall distillation column is generally less than that of two new thermally coupled distillation columns, the use of a dividing wall distillation column will be described first, followed by a description of the use of two thermally coupled distillation columns.

When using a dividing wall distillation column, the desorbent component is withdrawn from the dividing wall distillation column in a sidedraw stream, usually with $C_{10}$–$C_{15}$ paraffins and olefins. The dividing wall distillation column also produces an overhead stream comprising the purge component and a bottom stream comprising the aromatic byproducts. The dividing wall distillation column has two inlets, one for each of the purge stream and the desorbent stream, and three outlets, one outlet for each of the overhead stream, the sidedraw stream, and the bottom stream.

The dividing wall distillation column generally has two inlet ports. One inlet port is for introducing one feed stream to an upper vapor-liquid contacting area of the dividing wall distillation column, and another inlet port is for introducing another feed stream to a middle vapor-liquid contacting area of the dividing wall distillation column. As explained in further detail below, the column may have additional inlet ports.

The dividing wall distillation column is usually a vertically oriented cylindrical column having a shell with a cylindrical inner surface. As used herein, the phrase "vertically oriented" means forming an angle with the horizontal of generally between about 85 and about 95 degrees, and preferably between about 87.5 and 92.5 degrees. The dividing wall distillation column has three distillation vapor-liquid contacting areas—an upper area, a middle area, and a lower area. The middle vapor-liquid contacting area contains at least one partition or dividing wall, the plane of which is usually vertically oriented. Usually, the longitudinal axis of the middle vapor-liquid contacting area is also vertically oriented, as are the longitudinal axes of the upper and lower vapor-liquid contacting areas. The dividing wall divides the middle vapor-liquid contacting area into two sections, a feed-side section and a sidedraw-side section. In the case of a single dividing wall and neglecting the areas occupied by the thickness of the dividing wall and the thickness of the column wall, the area of any horizontal cross-section of the column is divided between the feed-side section and the sidedraw-side section. The division of the column's horizontal cross-section between these two sections is not necessarily equal. The division depends in part on the composition of the feed stream entering the middle vapor-liquid contacting area and on the proportion of that feed that is in the vapor phase. The area of the feed-side section may be from about 30% to about 60% of the area of any horizontal cross-section. The area of the sidedraw-side section is generally from about 40% to about 70% of the area of any horizontal cross-section. The dividing wall divides the middle vapor-liquid contacting area into two sections, a feed-side section and a sidedraw-side section. Multiple partitions or dividing walls may divide the middle vapor-liquid contacting area into more than two sections.

Each partition or dividing wall is generally a baffle that is preferably imperforate. Each dividing wall may be a single piece or may consist of multiple sectional pieces that are affixed together, such as by welding or bolting. The baffle is generally rectangular having two faces and four edges. One face of the baffle faces the feed-side section of the middle vapor-liquid contacting area, and the other face faces the sidedraw-side section. The four edges are arranged in two pairs of generally opposing edges. One pair of edges comprises the side edges of the baffle. In the case of a single baffle, each edge of this pair is usually affixed to the inside surface of the column wall of the middle vapor-liquid contacting area, and preferably, each edge of this pair is sealingly engaged to the inside surface wall in a manner, such as by seal welding, so that with respect to passing between the attached edge and the column wall, fluids in one section of the middle vapor-liquid contacting area are not in communication with fluids in any other section of the middle vapor-liquid contacting area. Neither edge of the other pair of generally opposing edges of the dividing wall is attached to the column wall. One of the edges of this other pair is the top edge of the dividing wall and delineates the top of the middle vapor-liquid contacting area and the bottom of the upper vapor-liquid contacting area. The other edge is the bottom edge of the dividing wall and delineates the bottom of the middle vapor-liquid contacting area and the top of the lower vapor-liquid contacting area. None of the four edges is necessarily straight. For example, depending on the contour of the column wall, the side edges may be shaped or rounded in order to facilitate attachment of the dividing wall to the column wall. Also, the top edge may be shaped or segmented in a manner that facilitates attachment or fit-up between the dividing wall and plates or other column internals in the top of the middle vapor-liquid contacting area and/or the bottom of the upper vapor-liquid contacting area. Likewise, the bottom edge may be shaped to enhance the fit between the dividing wall and plates or internals at the bottom of the middle vapor-liquid contacting area and/or the top of the lower vapor-liquid contacting area.

The thickness of the dividing wall may be any suitable thickness, subject to mechanical requirements of the structural strength of the dividing wall, attachment to the column wall, or attachment to other column internals including other dividing walls in the column. The thickness of the dividing wall depends on the column diameter, but is usually between 3/8 in and 3/4 in (9.5 and 19.1 mm) for column diameters between 6 ft and 36 ft (1.8 and 11.0 m). The dividing wall may comprise two walls with a gas space in between, such as disclosed in U.S. Pat. No. 5,785,819. The dividing wall may be constructed from any suitable material, and it is believed preferable that that the dividing wall and the column wall shell are of the same material. The dividing wall material is usually carbon steel. The surfaces of the faces of the dividing wall are generally smooth. However, either surface may have liquid deflectors, such as disclosed in U.S. Pat. No. 5,785,819.

Vapor-liquid contacting devices are in the upper, middle, and lower vapor-liquid contacting areas of the dividing wall distillation column. Any suitable vapor-liquid contacting device may be used. Suitable vapor-liquid contacting devices, including plates and packing, and their performances are described at pages 14–24 to 14–61 of *Perry's Chemical Engineers' Handbook*, 7$^{th}$ Edition, edited by D. W. Green et al., published by McGraw-Hill, New York, in 1997. As used herein, the term "plate" includes tray, and suitable trays include those formed from a number of adjacent triangular (v-shaped) downcomers or other multiple downcomers, which are disclosed in U.S. Pat. Nos. 5,262,094, 5,366,666, 5,407,605, 5,554,329, and 5,707,563, the teachings of all of which are incorporated herein by reference. A bed-like layer of packing material may be closely adjacent to the bottom surface of the plate in the so-called "disengagement" zone under the plate. The packing may extend to the plate below.

In the upper vapor-liquid contacting area, one or more plates are usually located above the elevation of the inlet port for the feed stream introduced to the upper vapor-liquid contacting area, and one or more plates are usually located below that elevation and above the top edge of the dividing wall. In the feed-side section of the middle vapor-liquid contacting area, one or more plates are usually located above the elevation of the inlet port to the feed-side section and below the elevation of the top edge of the dividing wall, and one or more plates are usually located between that inlet port and the bottom of the dividing wall. One or more plates are usually in the sidedraw section, and one or more plates usually are in the lower vapor-liquid contacting area. Any of the plate spacings in any of these areas or sections may be the same as or different from not only plate spacings in other areas or sections but also spacings in the same area or section. Generally, the spacings for the plates at the elevation at which the feed streams are introduced into the column are generally greater than the spacings for other plates. The plates usually have a plate efficiency of 80%, but plates having a higher or lower efficiency may be used. As used herein, plate efficiency is the approach to equilibrium defined as the ratio of the actual change in vapor composition as the vapor passes through the plate to the change that would have occurred if the vapor had reached a state of equilibrium with the liquid leaving the plate.

Persons of ordinary skill in the art of distillation are aware that, with all other variables constant, the number of plates in a vapor-liquid contacting area generally varies directly with the V/L ratio. As used herein, the V/L ratio, or simply V/L, is the ratio of moles of upflowing vapor (V) to moles of downflowing liquid (L). The designer of a vapor-liquid contacting area for distillation arrives at the optimum number of plates and the optimum V/L ratio by trading-off or balancing the capital cost of the distillation column on the one hand with the operating cost on the other hand. In the design of the dividing wall distillation column, this trade-off is a consideration in each of the upper, middle, and lower vapor-liquid contacting areas; within the upper vapor-liquid contacting area to plates above the feed inlet; within the middle vapor-liquid contacting area to both the feed-side and sidedraw-side sections; and within the feed-side section to plates above and below the feed inlet. Accordingly, a person of ordinary skill in the art is aware that the number of plates in a vapor-liquid contacting area of the dividing wall distillation column may vary, depending on the V/L in that area. Where packing is used in a vapor-liquid contacting area, either in addition to or instead of plates, such a vapor-liquid contacting area is usually designed based on the hydraulic performance (e.g., pressure drop, flooding, and loading) and mass transfer performance (e.g., height equivalent to a theoretical plate, or HETP).

In the upper vapor-liquid contacting area, the plates above purging effluent inlet function as a rectification zone to decrease the concentration of the $C_{10}$–$C_{15}$ paraffins and olefins that enter the dividing wall distillation column with the purging effluent. These plates also help decrease the concentration of the desorbent component (e.g., benzene) in the upflowing vapor in order to attain a highly concentrated overhead stream comprising n-pentane. The plates below the purging effluent inlet in the upper vapor-liquid contacting area act as a stripping section to decrease the concentration of n-pentane in the downflowing liquid without significant decreasing the concentrations of benzene and $C_{10}$–$C_{15}$ paraffins and olefins. The plates below the desorption effluent inlet in the feed-side section act as a stripping section to decrease the concentrations of n-pentane without significantly decreasing the concentrations of aromatic byproducts and $C_{10}$–$C_{15}$ paraffins and olefins in the downflowing liquid. The V/L in the feed-side section below the desorption effluent inlet, as well as the temperature at the bottom of the dividing wall in the feed-side section, are important parameters for controlling the concentration of n-pentane in the sidedraw stream. The plates in the lower vapor-liquid contacting area act as a stripping zone not only to further decrease the concentration of n-pentane but also to decrease the concentration of benzene in the downflowing liquid in order to attain a highly concentrated bottom stream comprising aromatic byproducts and a minimal amount, if any, of $C_{10}$–$C_{15}$ paraffins and olefins. The plates above the sidedraw outlet in the sidedraw-side section act as a stripping section to decrease the concentrations of n-pentane in the descending liquid. The plates below the sidedraw outlet in the sidedraw-side section act as a rectification section to decrease the concentrations of aromatic byproducts in the ascending vapor.

An inlet port is in communication with the upper vapor-liquid contacting area to introduce a feed fluid to the upper vapor-liquid contacting area. Examples of ports include but are not limited to conduit fittings and vessel nozzles. This inlet port is not in communication with the condenser. Fluid, such as a feed stream, passing through this inlet port passes to the upper vapor-liquid contacting area rather than to or from the condenser. Another inlet port is in communication with the feed section of the middle vapor-liquid contacting area, to introduce fluid to the feed section. Although the fluid introduced to the feed section usually has a different composition and/or different flowing conditions (i.e., flow rate, temperature, pressure) from that introduced to the upper vapor-liquid contacting area, both fluids may have the same composition and same flowing conditions.

A condenser is in communication with the upper vapor-liquid contacting area. The condenser is capable of condensing vapor to liquid, either as a total condenser or a partial condenser of the entering vapor, and such condensers are well known to a person of ordinary skill in the art. The condenser may be external to the column or located within the column. In a particular embodiment, the condenser may be a contact condenser. In a contact condenser, the condensing medium directly contacts the stream being condensed usually over a vapor-liquid contacting device, such as packing or any of the previously-mentioned gas-liquid contacting devices. Although the contact condenser may be external to the column, preferably the contact condenser is located within the column, and usually above the uppermost plate of the upper vapor-liquid contacting area. Vapors rising from the uppermost plate of the upper vapor-liquid contacting area pass upwardly through the contact condenser and countercurrently to the downward flow of the cooling medium. A net stream of uncondensed vapor, if any, may be withdrawn from the top of the contact condenser and sent to recovery facilities. A liquid stream comprising condensing medium and condensed vapors is withdrawn from the bottom of the contact condenser. Usually, a portion of the liquid stream is withdrawn as a net stream from the bottom of the contact condenser and sent to recovery facilities, and the remaining portion is cooled and recycled to the top of the contact condenser. The contacting medium can comprise lighter components that entered the column with one or both of the feed streams. The use of a contact condenser is advantageous because the pressure drop for the stream being condensed across a contact condenser is small relative to that across other condensers, which in turn allows the dividing wall distillation column to operate at a lower pressure.

An internal condenser may be located within the column directly above the upper vapor-liquid contacting area, and so there is communication between the condenser and the upper vapor-liquid contacting area. For an external condenser, communication with the upper vapor-liquid contacting area may be via one or more ports, conduits, and/or accumulators. Thus, a nozzle attached to the shell of the dividing wall distillation column vessel may be connected to the condenser to permit vapor to flow from the upper vapor-liquid contacting area to the condenser. A nozzle attached to the shell of the column vessel may be connected to the condenser to allow liquid flow from the condenser to the upper vapor-liquid contacting area. An accumulator may be located between the condenser and the upper vapor-liquid contacting area, to collect condensed liquids and separate the liquids from uncondensed vapor, and this accumulator may be in communication via ports or conduits with the condenser and the upper vapor-liquid contacting area. A pump may be used to pump liquid from the accumulator to the upper vapor-liquid contacting area, and the liquid flow may be regulated by a control valve. Although the outlet port for vapors from the dividing wall distillation column and the inlet port for liquid to the dividing wall distillation column are preferably separate ports, they may be the same port, with relatively less-dense vapor rising and relatively more-dense liquid falling through the same port.

In the upper vapor-liquid contacting area, an accumulator plate is preferably used to collect liquid that passes downward through the bottom-most gas-liquid contacting plate in the upper vapor-liquid contacting area. As used herein, the term "accumulator plate" generally refers to a plate on which downflowing liquid can collect and through which upflowing vapor can pass, but nevertheless on which no substantial vapor-liquid contacting or distillation occurs. Even though an inventory of liquid may collect on the upper side of the accumulator plate, upflowing vapors passing from the under side to the upper side of the accumulator plate do not pass through or contact that liquid to any significant extent, because the vapors pass through channels which discharge the vapors on the top side of the accumulator plate at an elevation that is above the surface of the accumulated liquid. Having in effect bypassed the liquid on the accumulator plate, these vapors then flow upward to the under side of the next higher plate in the column. Referring now to the particular accumulator plate that is preferably used for the upper vapor-liquid contacting area, this accumulator plate preferably prevents any of the liquid that collects on it from passing downward to the feed-side section of the middle vapor-liquid contacting area. When such an accumulator plate is used, essentially all of the unsorbed components that enter the dividing wall distillation column with the purging effluent are directed to the sidedraw-side section of the middle vapor-liquid contacting area, so that they may be recovered in the sidedraw stream rather than in the bottom stream. In some embodiments of this invention, the dividing wall distillation column may comprise another inlet port in communication with the feed-side section in order to introduce liquid into the feed-side section of the column at a point directly below the accumulator plate of the upper vapor-liquid contacting area. Usually, this additional inlet port is located at the elevation of the uppermost plate on the feed-side section. Liquid entering through this port in effect provides reflux for plates located in the feed-side section of the column.

In the middle vapor-liquid contacting area, in the sidedraw-side section, embodiments of this invention preferably include an accumulator plate and a downcomer from which downflowing liquid may be withdrawn from the column. The liquid that collects on the accumulator plate preferably flows to the downcomer from which the liquid is in turn withdrawn from the dividing wall distillation column. Preferably both the accumulator plate and the downcomer prevent any of the liquid that collects on the accumulator plate or in the downcomer from passing downward to the plate below the accumulator plate. That is, preferably all of the liquid that collects on the accumulator plate or in the downcomer is withdrawn from the column. When an accumulator plate is used in the sidedraw-side section at the sidedraw, essentially all the unsorbed components that were present in the stream from which the aromatic byproducts were removed and that enter the column with the purging effluent can be recovered in the sidedraw stream rather than in the bottom stream, where they would be rejected from the process. The plates above the sidedraw outlet in the sidedraw-side section usually act as a stripping zone, and the plates below the sidedraw outlet in the sidedraw-side section act as a rectification zone. In some embodiments of this invention, the dividing wall distillation column may comprise another inlet port in communication with the sidedraw-side section in order to introduce liquid to the sidedraw-side section at a point directly below the accumulator plate of the sidedraw-side section. Usually, this additional inlet port is located at the elevation of the uppermost plate on the sidedraw-side section below the downcomer. Liquid entering through this port in effect provides reflux for plates located in the sidedraw-side section side of the column below the sidedraw accumulator plate.

In the lower vapor-liquid contacting area, it may be preferable to locate an accumulator plate above the uppermost gas-liquid contacting plate in the lower vapor-liquid contacting area. At that location, an accumulator plate could collect the two downflowing liquids that exit the bottom of the middle vapor-liquid contacting area, namely the liquids exiting from the bottom of the feed-side and sidedraw-side sections. These liquids preferably would mix together on the accumulator plate in order to help ensure a relatively uniform composition of the liquid that flows from the accumulator plate to the gas-liquid contacting plates in the lower vapor-liquid contacting area. In addition, the liquid discharge or downcomer of the accumulator plate would be oriented to ensure that liquid falling from the accumulator plate would undergo efficient vapor-liquid contacting on the uppermost fractionating plate in the bottom vapor-liquid contacting area.

Usually, a reboiler is in communication with the lower vapor-liquid contacting area. The reboiler is capable of boiling liquid to vapor, usually as a partial reboiler of the entering liquid, and such reboilers are well known to a person of ordinary skill in the art. The reboiler may be an external reboiler or an internal reboiler located within the column. An internal reboiler may be located within the column directly below the lower vapor-liquid contacting area, and so there is communication between the reboiler and the lower vapor-liquid contacting area. For an external reboiler, communication with the lower vapor-liquid contacting area may be via one or more ports and/or conduits. Thus, a nozzle attached to the shell of the dividing wall distillation column vessel may be connected to the reboiler to permit liquid to flow from the lower vapor-liquid contacting area to the reboiler. A pump may be used to pump liquid from the column to the reboiler, and the liquid flow may be regulated by a control valve. Alternatively, the reboiler may be a so-called thermal siphon reboiler, in which reboiling changes the density of the material being reboiled and that density change, in turn, induces flow through the reboiler. A nozzle attached to the shell of the column vessel may be connected to the reboiler to allow vapor, or perhaps a vapor-liquid two-phase mixture, to flow from the reboiler to the lower vapor-liquid contacting area. Although the outlet liquid for liquid from the dividing wall distillation column and the inlet port for vapor to the dividing wall distillation column are preferably separate ports, they may be the same port, with relatively more-dense liquid falling and relatively less-dense vapor rising and through the same port.

The sidedraw stream is highly concentrated in benzene. The concentration in the sidedraw stream of hydrocarbons lighter than benzene, including n-pentane, is generally less than 2.5 wt-% and preferably less than 500 wt-ppm. The concentration in the sidedraw stream of aromatic byproducts is generally less than 0.5 wt-% and preferably less than 500 wt-ppm. As used herein, the term "recovery" of a component is computed by dividing the quantity of that component recovered from the dividing wall distillation column in one of the overhead stream, sidedraw stream, or bottom stream by the quantity of that component charged to the dividing wall distillation column in one or more of the desorption and purging effluents, and multiplying by 100. If the engineering units of quantity in the numerator and the denominator are the same, then recovery is dimensionless and is expressed as a percent. The recovery in the overhead stream of n-pentane that entered with the purging and desorption effluents is generally greater than 85% and preferably greater than 90%. The recovery in the sidedraw stream of benzene that entered with the purging and desorption effluents is generally greater than 85%, preferably greater than 90%, and even more preferably greater than 99.0%. The recovery in the sidedraw stream of $C_{10}$–$C_{15}$ paraffins and olefins that entered with the purging effluent is generally greater than 85%, preferably greater than 90% and even more preferably greater than 99.0%. Finally, the recovery in the bottom stream of aromatic byproducts that entered with the desorption effluent is generally greater than 85% and preferably greater than 90%.

When using two thermally coupled distillation columns, whether fully thermally coupled or not, the desorption effluent passes to a prefractionator, the purging effluent passes to the main column, and three streams are withdrawn from the main column: an overhead stream comprising n-pentane, a sidedraw stream comprising benzene, and a bottom stream comprising aromatic byproducts.

As used herein, two distillation columns are said to be thermally coupled if at least part of the heat transfer that is used for separation in the first column is provided by directly contacting the material being fractionated in the first column with a product stream from the second column. Direct contacting occurs when fluids withdrawn from a location inside the second column (e.g., from a plate, downcomer, packing, liquid sump, vapor space, etc.) are introduced into a location where fluids are present in the first column (e.g., into a plate, downcomer, packing, liquid sump, or vapor space), without first passing through a heat exchanger, such as a condenser or a reboiler. The phrase "without first passing through a heat exchanger" means that the heat content of the fluids entering the first column is generally from 95% to 105%, preferably from 99% to 101%, and more preferably from 99.5 to 100.5%, of the heat content of the fluids withdrawn from the second column. In practice, passing fluid from the second column to the first column results in the transfer of a small amount of heat between the fluid and the ambient surroundings, even if the fluid does not pass through a heat exchanger and even if the fluids are passed through a well-insulated conduit or line. The amount of heat exchanged between the fluid and the ambient surroundings is generally less than 5%, preferably less than 1%, and more preferably less than 0.5%, of the heat content of the fluids.

In a common arrangement of two thermally coupled distillation columns, instead of each column functioning as a "stand-alone" column with its own reboiler, a vapor stream from a plate (or a downcomer, packing, vapor space, etc.) inside the first column passes through a conduit to the bottom of the second column, and the liquid stream from the bottom of the second column passes through a conduit to a plate (or a downcomer, packing, sump, vapor space, etc.) inside the first column. Thus, the reboiler of the first column provides the reboiling duty for not only the first column but also the second column, and the second column does not have its own reboiler. In another common arrangement, a liquid stream from a plate (or a downcomer, packing, sump, etc.) inside the first column passes through a conduit to the top of the second column, and the vapor stream from the top of the second column passes through a conduit to a plate (or downcomer, packing, sump, vapor space, etc.) inside the first column. In this arrangement, the condenser of the first column provides the condensing duty for the first as well as the second column, and the second column does not have its "own" condenser. Examples of such thermally coupled distillation columns are shown in FIGS. 2(a) and 2(b) of the above-mentioned article by C. Triantafyllou and R. Smith, in Trans IChemE, Vol. 70, Part A, March 1992, 118–132.

FIG. 2(c) of the article by C. Triantafyllou and R. Smith shows an arrangement of two thermally coupled distillation columns that are said to be fully thermally coupled, since one of the columns (the prefractionator) has neither its own condenser nor its own reboiler and the other column (the main column) has both a condenser and a reboiler. The condenser and reboiler of the main column provide the condensing duty and reboiling duty, respectively, not only for the main column but also for the prefractionator. Thus, the vapor stream from the top of the prefractionator passes through a conduit to a plate inside the main column, and a liquid stream from a plate inside the main column passes through a conduit to the top of the prefractionator. Also, the liquid stream from the bottom of the prefractionator passes through a conduit to a plate inside the main column, and a vapor stream from a plate inside the main column passes through a conduit to the bottom of the prefractionator. See also the article by H. Rudd in The Chemical Engineer, Distillation Supplement, Aug. 27, 1992, s14–s15.

When using two fully thermally coupled distillation columns, the prefractionator separates the desorption effluent into a prefractionator overhead vapor stream and a prefractionator bottom liquid stream. In the prefractionator above the desorption effluent inlet, the plates act as a rectification section to decrease the concentrations of aromatic byproducts in the upflowing vapor. In the prefractionator, below the elevation of the desorption effluent inlet, the plates act as a stripping section to decrease the concentrations of n-pentane without significantly decreasing the concentrations of aromatic byproducts in the downflowing liquid. The vapor-liquid contacting devices previously described for use in the dividing wall distillation column are suitable for use in the prefractionator.

In the main column, the plates above the elevation where the purging effluent is introduced help to decrease the concentration of $C_{10}$–$C_{15}$ paraffins and olefins and to decrease the concentration of benzene in the upflowing vapors. Below the elevation where the purging effluent is introduced and above the elevation where the prefractionator overhead vapor stream is introduced and the liquid stream from the main column is withdrawn for the prefractionator, the plates act as a stripping section to decrease the concentration of n-pentane in the descending liquid without significantly decreasing the concentrations of benzene and $C_{10}$–$C_{15}$ paraffins and olefins. Below the elevation where the prefractionator overhead vapor is introduced and the liquid stream from the main column is withdrawn for the prefractionator and above the elevation where the sidedraw stream is withdrawn, the plates act as a stripping section to decrease the concentration of n-pentane from the descending liquid. The area of the main column below the elevation where the sidedraw stream is withdraw and above the elevation where the vapor stream from the main column is withdrawn and the prefractionator bottom liquid stream is introduced acts as a rectification section to decrease the concentrations of aromatic byproducts in the ascending vapors. In the main column below the elevation where the vapor stream from the main column is withdrawn and the prefractionator bottom liquid stream is introduced, this area of the main column acts as a stripping zone to decrease the concentrations of n-pentane and benzene. Any suitable plate spacing(s) may be used in the main column. The vapor-liquid contacting devices previously described for use in the dividing wall distillation column are suitable for use in the main column. In a manner similar to that described previously for the dividing wall distillation column, a person of ordinary skill in the art of distillation can determine optimum numbers of plates and optimum V/L ratios for the main column, as well for in the prefractionator column.

In one process flow arrangement, the prefractionator and the main column are thermally coupled distillation columns but are not fully thermally coupled distillation columns, because a liquid stream from the main column is not withdrawn for the prefractionator. Instead, all or essentially all of the liquid that flows downward in the main column at the elevation where the prefractionator overhead vapor stream is introduced continues flowing downward in the main column. In this way, any $C_{10}$–$C_{15}$ paraffins and olefins in that downflowing liquid are not withdrawn and introduced into the prefractionator, but instead remain in the main column. In this way, the unsorbed components that were present in the stream from which the aromatic byproducts were removed and that enter the main column with the purging effluent are recovered in the sidedraw stream rather than in the bottom stream, where they would be rejected from the process. In those embodiments of this invention where little or none of the liquid flowing downward in the main of the column passes to the prefractionator, a liquid stream is preferably introduced into the prefractionator at an elevation above the top prefractionator plate. This liquid stream in effect provides reflux for plates located in the prefractionator. This liquid stream preferably has a low concentration of the unsorbed components of the stream from which the aromatics byproducts are removed.

In another process arrangement, the sidedraw is withdrawn from the main column via a downcomer into which liquid flows, preferably from an accumulator plate. More preferably, both the accumulator plate and the downcomer prevent any of the liquid that collects on the accumulator plate or in the downcomer from passing downward to the plate below the accumulator plate. By collecting and withdrawing all of the downflowing liquid at the sidedraw, essentially all of the unsorbed components that were present in the stream from which the aromatic byproducts were removed and that were flowing downward in the main column above the sidedraw are recovered in the sidedraw stream rather than in the bottom stream, where they would be rejected from the process. In this embodiment, a liquid stream is preferably introduced into the main column at a point directly below the sidedraw accumulator plate to effectively provide reflux for plates located below the sidedraw accumulator plate. This liquid stream preferably has a low concentration of the unsorbed components of the stream from which the aromatics byproducts are removed.

When using two thermally coupled distillation columns such as described above that are not fully thermally coupled, the composition of the sidedraw stream withdrawn from main column is generally the same as that already described for the sidedraw stream withdrawn from the dividing wall distillation column. In addition to producing a sidedraw stream, the main column also produces a net overhead stream and a net bottom stream. The composition of the main column's net overhead stream is generally the same as that described previously for the net overhead stream of the dividing wall distillation column, and the composition of the main column's net bottom stream is generally the same as that described previously for the net bottom stream of the dividing wall distillation column.

Regardless whether the sidedraw stream is produced by a dividing wall distillation column or by two thermally coupled distillation columns, whether fully thermally coupled or not, the sidedraw stream generally passes to a selective alkylation zone, as described previously. The effluent recovered from the selective alkylation zone usually passes to a product recovery section, which generally comprises at least three columns. The first column, or benzene column, separates the reactor effluent and removes unreacted aromatic compound reactant (e.g., benzene) as an overhead stream for recycle to, for example, the selective alkylation zone. The second, or paraffin, column removes paraffins from a bottom stream of the benzene column and produces a paraffin-containing overhead stream for recycle to the paraffin dehydrogenation zone. The third, or LAB, column separates a bottom stream from the paraffin column and produces an overhead stream containing LAB, which is recovered as product. Heavy alkylate is recovered as a bottom stream from the LAB column and may be further separated in a fourth column to recover any LAB present in the LAB column bottom stream.

The apparatus embodiment of this invention comprises at least one temperature measuring device operably connected to the column so as to measure the temperature of fluid in the column and to establish a signal representative of that temperature. More than one temperature measuring device may be used. Each temperature measuring device may be, for example, a thermocouple, a resistance bulb, or any suitable device that detects temperature.

Generally, each temperature measuring device is arranged with or connected to the column so that it is capable of measuring the temperature of fluid in any of the vapor-liquid contacting areas, whether in a dividing wall distillation column or in two thermally coupled distillation columns. In the case of a dividing wall distillation column, fluid temperature may be measured in the upper vapor-liquid contacting area, the sidedraw-side section, or the lower vapor-liquid contacting area. When fluid temperature is measured in any of these locations, it is believed that, without limiting this invention to any particular theory or explanation, that the control apparatus is configured or the control method operates in, at least in part, a feedback fashion. The fluid temperature may also be measured in the feed-side section, in which case it is believed that, again without limiting this invention in any way, that the control apparatus is configured or the control method operates in, at least in part, a feed-forward manner. Similarly, in the case of two thermally coupled distillation columns, a location in the main column is believed to give the control apparatus or method at least some feedback aspects regardless whether the location is above or below the sidedraw. A location in the prefractionator either above or below the elevation of the sidedraw is believed to give at least some feedforward aspects to the control apparatus or control method.

Each temperature measuring device establishes a signal that is representative of the temperature of the fluid at the location or on the plate where the temperature measuring device is positioned. The signal can be any suitable representation of the temperature of the fluid, and, without limiting this invention in any way, may be electronic, pneumatic, optical, radiowave, microwave, or of any suitable nature. Each signal is generally provided or inputted in some manner to a controller, which compares the signal with a set point that is representative of a desired value of the inputted signal. In one embodiment of this invention, the signal is compared to the set point, and another signal representative of the difference between the set point and the signal is generated. This invention is also not limited by the nature of the signal generated by the controller.

More than one temperature measuring device may be in any vapor-liquid contacting area, and more than one vapor-liquid contacting area may have a temperature measuring device. When more than one temperature measuring device is used, the signal from each temperature measuring device may be directed separately to individual controllers. Alternately, more than one signal may be combined to produce a combined signal, and that combined signal may be directed to a controller. Combining signals can be done in any manner that produces a signal that is responsive to each of the signals that are combined. Thus, the combined signal that is produced may be responsive to more than one signal. As used herein, one signal may be responsive to another signal even if the former signal is responsive both to the latter signal and to some other signal. Examples of combining signals include summing signals, which, as used herein, includes both adding and subtracting signals.

The combined signal need not be responsive to the same extent to each of the signals that are combined. For example, one or more of the signals that are combined may, prior to combining, be weighted. That is, one or more of the signals that are combined may be given some gain and/or bias. An example of giving gain to a signal is multiplying the signal by a numerical scalar to increase or decrease the relative weight of that signal relative to that of one or more other signals. An example of giving bias to a signal is adding or subtracting a numerical constant to increase or decrease the relative weight of that signal relative to that of one or more other signals. Each or all of the other signals that are to be combined may or may not be weighted. Alternatively, one or more signals may be combined, the combined signal may be weighted, and then the weighted combined signal may itself be combined with other weighted or non-weighted individual or combined signals. Suitable weighting devices may be pneumatic or mechanical, but most commonly they are computer-based electronic systems. Suitable weighting devices are known to persons of ordinary skill in the art of process control and instrumentation.

When a scalar is used to weight signals, a different scalar may be applied to each of the signals that are combined, the same scalar may be applied to more than one of the signals that are combined, or a scalar may be applied to some of the signals that are combined but not to other signals. Although each scalar applied to a signal can be any rational or irrational number, generally scalars are non-negative rational numbers between zero and one. More specifically, where there are two temperature measuring devices establishing two signals, and each signal is multiplied by its respective scalar having a value of from zero to one, various combinations of scalars are possible. For example, one scalar may be between 0 and 0.5 and the other may be between 0.5 and 1.0; one scalar may be between 0.25 and 0.45 and the other may be between 0.55 and 0.75; or one scalar may be zero and the other scalar may be one.

As previously mentioned, a signal from one or more temperature measuring devices, whether combined or not, is directed to a controller. The controller compares the signal with a set point, which is representative of some desired value of the inputted signal. Generally, the controller compares the set point and the inputted signal and establishes an output signal that is representative of this comparison. Although the controller may compare the inputted signal and the set point in any manner, usually the comparison consists of determining the difference between the inputted signal and the set point. That difference in turn determines in part the output signal of the controller. However, as a person of ordinary skill in the art of controllers knows, the output signal of the controller depends on the design and settings of the controller and on factors such as the magnitude of the difference, the rate of change of the difference, and the duration of time that the difference has existed. Persons of ordinary skill in the art of process control are able to choose suitable controllers, including PID (proportional-integral-derivative) or other controllers, and to select the proper tuning constants for the functions of the controller in order to achieve the desired output signal of the controller. Selection of the proper tuning constants is based on the dynamic characteristics of the dividing wall distillation column and/or on the process in which the column is used. Selection also depends on the variable or device which the controller manipulates or regulates in order to achieve a decrease in the difference between the inputted signal and the set point. Controllers may be tuned relatively aggressively, so that the controller decreases the difference to zero relatively rapidly. Alternatively, controllers may be tuned less aggressively, in which case the controller decreases the difference to zero relatively slowly but with less tendency to overshoot or undershoot the condition of zero difference.

In the most general sense, the variable that is manipulated or regulated in order to adjust the temperature at a point in the column is the heat input to or heat removal from the column. Examples of manipulating the heat input or heat removal are adjusting the reflux to the upper vapor-liquid contacting area, adjusting the flow rate of the heat exchange medium to a contact condenser (if any) in communication with the upper vapor-liquid contacting area, adjusting the liquid stream introduced to below the elevation of the sidedraw withdraw, adjusting the liquid flow to a reboiler that is generating vapor that is in turn routed to the column, and adjusting the heat exchange medium to such a reboiler. If the temperature measured by the temperature measuring device is vertically above the elevation of the sidedraw, then regulating the temperature is preferably accomplished by adjusting the flow rate of the reflux to the upper vapor-liquid contacting area, or adjusting the flow rate of the heat exchange medium to a contact condenser in communication with the upper vapor-liquid contacting area. In the case of a dividing wall distillation column or two thermally coupled distillation columns, the temperature measuring device is above the elevation of the sidedraw if the elevation of the temperature measuring device is vertically higher than or above the elevation of the plate from which the sidedraw is withdrawn, regardless whether the temperature is or is not measured in the sidedraw-side section (in the case of a dividing wall distillation column) or is or is not measured in the main column (in the case of two thermally coupled distillation columns). Thus, in the case of a dividing wall distillation column, if the temperature measuring device measures a temperature in the feed-side section, the sidedraw-side section, or the upper vapor-liquid contacting area, and if the elevation of that temperature measurement is above that of the sidedraw in the sidedraw-side section, then the preferred adjusted variables are the flow rate of the reflux to the upper vapor-liquid contacting area or the flow rate of the heating medium to a contact condenser, if any. These two variables are also the preferred variables to adjust in the case of two thermally coupled distillation columns where the temperature measuring device measures a temperature in the prefractionator or the main column, provided that the elevation of that measured temperature in the prefractionator or main column is above or higher than the elevation of withdrawal of the sidedraw from the main column.

If the temperature measured by the temperature measuring device is vertically below the elevation of the sidedraw, then regulating the temperature is preferably accomplished by adjusting the liquid stream introduced to below the elevation of the sidedraw withdraw, adjusting the liquid flow to a reboiler that is generating vapor that is in turn routed to the column, or adjusting the flow rate of the heat exchange medium to such a reboiler. In the case of a dividing wall distillation column or two thermally coupled distillation columns, the temperature measuring device is below the elevation of the sidedraw if the elevation of the temperature measuring device is vertically lower than or below the elevation of the plate from which the sidedraw is withdrawn, regardless whether the temperature is or is not measured in the sidedraw-side section (in the case of a dividing wall distillation column) or is or is not measured in the main column (in the case of two thermally coupled distillation columns). Thus, in the case of a dividing wall distillation column, if the temperature measuring device measures a temperature in the feed-side section, the sidedraw-side section, or the lower vapor-liquid contacting area, and if the elevation of that temperature measurement is below that of the sidedraw in the sidedraw-side section, then the preferred adjusted variables are the liquid stream introduced to the sidedraw-side section below the sidedraw, the liquid flow to a reboiler that is generating vapor that is in turn routed to the column, and the flow rate of the heat exchange medium to such a reboiler. Similarly, the liquid stream to the main column below the sidedraw, the liquid flow to a reboiler that is generating vapor that is in turn routed to the column, and the flow rate of the heat exchange medium to such a reboiler are also the preferred variables to adjust in the case of two thermally coupled distillation columns where the temperature measuring device measures a temperature in the prefractionator or the main column, provided that the elevation of that measured temperature in the prefractionator or the main column is above or higher than the elevation of the sidedraw withdraw in the main column.

In a dividing wall distillation column, where there are two temperature measuring devices and two temperature signals, particularly preferred locations for the temperatures measured by the temperature measuring devices are both in the upper vapor-liquid contacting area, both in the sidedraw-side section, one in the feed-side section and one in the sidedraw-side section, one in the upper vapor-liquid contacting area and one in the sidedraw-side section, one in the upper vapor-liquid contacting area and one in the feed-side section, and one in the lower vapor-liquid contacting area and one in the sidedraw-side section. As previously mentioned, the signals from these temperature measuring devices may be combined to regulate or manipulate one variable, or each signal may separately regulate or manipulate its own variable.

Figure 2:
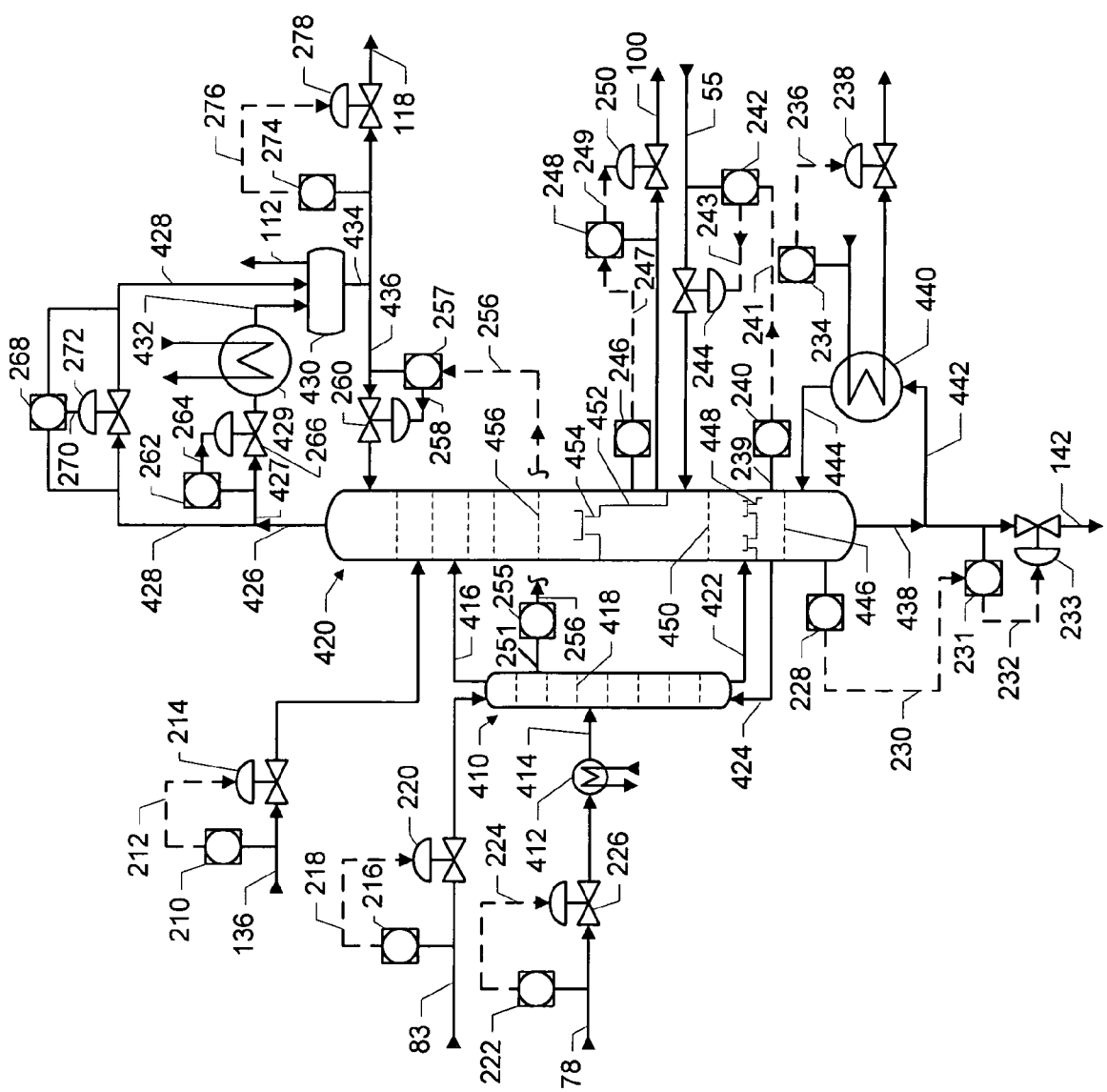
Figure 3:
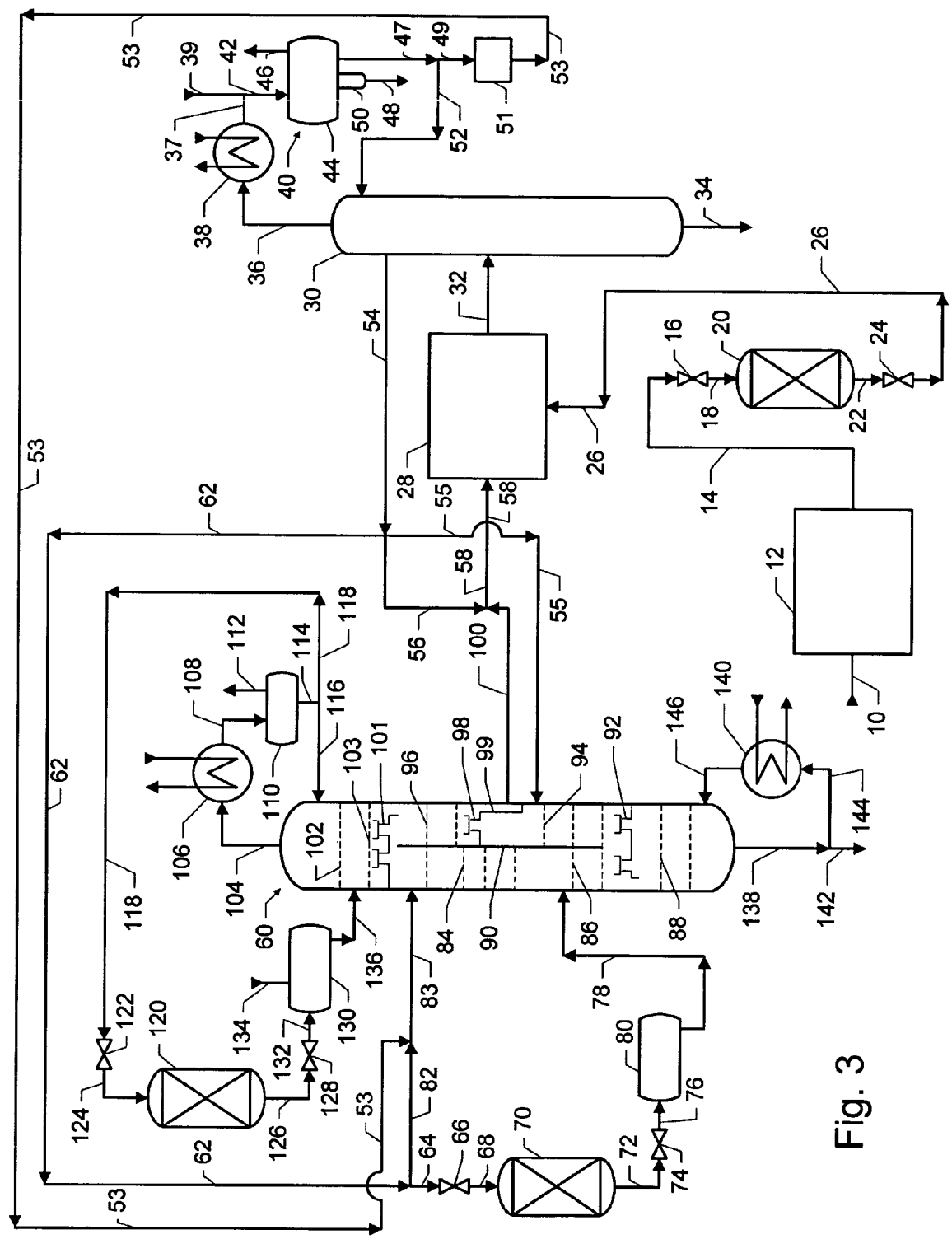
FIG. 3 shows a process in which the invention may be used.

Referring now to the figures, FIGS. 1–3 are presented solely for purposes of illustration and are not intended to limit the scope of the invention as set forth in the claims. FIGS. 1–3 show only the equipment and conduits necessary for an understanding of the invention and do not show equipment such as pumps, compressors, heat exchangers, and valves which are not necessary for an understanding of the invention and which are well known to persons of ordinary skill in the art of hydrocarbon processing.

FIG. 3 illustrates a process in which the invention may be used. FIG. 3 depicts three sorbent-containing beds, 20, 120, and 70. Each sorbent bed is performing a different function. Sorbent bed 20 is on-stream and functions to remove aromatic byproducts from a dehydrogenated product stream flowing in conduit 14. Sorbent bed 120 is off-stream and its void volume is being purged by a purging stream containing n-pentane which flows in conduit 118. Sorbent bed 70 is also off-stream and aromatic byproducts on its sorbent are being desorbed by a desorbent stream containing benzene which flows in conduit 64. Each sorbent bed is shown with an inlet valve and an inlet conduit (16 and 18 for bed 20, 122 and 124 for bed 120, and 66 and 68 for bed 70, respectively), and an outlet conduit and an outlet valve (22 and 24 for bed 20, 126 and 128 for bed 120, and 72 and 74 for bed 70, respectively). The depicted arrangement of the inlet and outlet valves and conduits of the beds permits the inlet and outlet of each bed to be closed, so that, using other additional valves and conduits which are not shown but which a person of ordinary skill in the art can provide, the function of each bed can be periodically shifted to function as that of one of the other two beds in FIG. 3. Thus, in addition to being capable of functioning for sorption as shown in FIG. 3, on-stream bed 20 is also capable of functioning in the position shown in FIG. 3 for either off-stream bed 120 (purging) or off-stream bed 70 (desorption). Similarly, off-stream bed 120 is also capable of functioning in the position shown for either on-stream bed 20 or off-stream bed 70, and off-stream bed 70 is also capable of functioning in the position shown for either on-stream bed 20 or off-stream bed 120. Accordingly, in normal operation, the on-stream bed 20 and off-stream beds 120 and 70 can be periodically shifted, so that on-stream bed 20 functions as off-stream bed 120, off-stream bed 120 functions as off-stream bed 70, and off-stream bed 70 functions as on-stream bed 20. Additional beds (not shown) may also be available for functioning in the positions shown for any of beds 20, 120, and 70. The number of beds required to operate the process depends on many factors, including the duration of the sorption, purging, and desorption functions; the desired extent of removal of aromatics byproducts during sorption; the desired recovery of paraffins and olefins during purging; and capital and operating costs. However, a person of ordinary skill in the art can readily determine the optimum number of beds required to meet the desired objectives. In general, however, at least one sorbent bed is required, since even a single bed can function first in the position of bed 20, then in the position of bed 120, and finally in the position of bed 70, before functioning once again in the position of bed 20. More commonly, two or more beds are used, so that, as shown in FIG. 3, while one bed is functioning in the position of bed 20, other beds are functioning in the positions of beds 120 and 70. By shifting of the functions of one or more beds, the removal of aromatic byproducts from the dehydrogenated product stream can range from a batchwise operation with relatively long interruptions between periods of removal to an essentially continuous operation, although in practice the removal may even then be semi-continuous due to short but finite times required for shifting functions. Likewise, the purging and desorption functions may occur batchwise and relatively infrequently or essentially continuously.

Referring now to FIG. 3, a paraffin feed stream comprising an admixture of $C_{10}$–$C_{15}$ normal and branched paraffins is charged via conduit 10. The paraffin feed stream is usually obtained in part from the product of a paraffin adsorptive separation zone and in part from recycled paraffins recovered from the stream in conduit 34, although the adsorptive separation zone, the recovery of paraffins from stream 34, and the combination of these two sources of paraffins is not shown in FIG. 3. The paraffins enter dehydrogenation zone 12, where the paraffins are contacted with a dehydrogenation catalyst in the presence of hydrogen at conditions which effect the conversion of a significant amount of the paraffins to the corresponding olefins. Some aromatic byproducts are formed, and some diolefins may also be formed. A dehydrogenated product stream containing unreacted paraffins, monoolefins, and aromatic byproducts passes through conduit 14, valve 16, and conduit 18, and enters bed 20, which is on-stream for removal of aromatic byproducts. On-stream bed 20 contains a molecular sieve sorbent which sorbs aromatic byproducts and removes them from the dehydrogenated product stream. The effluent of on-stream bed 20 passes through conduit 22, valve 24, and conduit 26, and enters selective alkylation zone 28, where monoolefins alkylate benzene to produce alkylbenzenes. Benzene for the alkylation reaction enters selective alkylation zone 28 in a stream that flows through conduit 58 and which contains not only benzene but also $C_{10}$–$C_{15}$ paraffins and n-pentane, and possibly a minor amount of water. An alkylated product stream containing alkylbenzenes, unreacted benzene, $C_{10}$–$C_{15}$ paraffins, n-pentane, and possibly water flows through conduit 32 to benzene column 30. Benzene column 30 produces a bottom stream in conduit 34 which contains alkylbenzenes and paraffins and which is sent to conventional product recovery facilities (not shown).

Benzene column 30 also produces an overhead stream in conduit 36 which contains unreacted benzene, n-pentane, and possibly water. The overhead stream may also contain light naphthenes, such as cyclohexane. The overhead stream is partially condensed in condenser 38, and the condensed overhead stream flows through conduit 37 to combine with fresh makeup benzene which is charged through conduit 39. The combined stream flows through conduit 42 and enters overhead receiver 40. Overhead receiver 40 consists of a horizontally-oriented section 44 for separating the entering stream into a vapor and a liquid and a vertically-oriented water boot 50 for separating the liquid into a hydrocarbon phase and a water phase. The vapor phase, which typically contains light paraffins, and water vapor, is withdrawn from section 44 via conduit 46, and the water phase is withdrawn from boot 50 via conduit 48. The hydrocarbon phase, which contains benzene, n-pentane, and water flows through conduit 47 and divides into two portions. One portion is returned to benzene column 30 as reflux in conduit 52, and the other portion flows through conduit 49 to a drier 51, which contains a desiccant to remove water. After drying, this portion flows to dividing wall distillation column 60 via conduits 53 and 83, for recovery of the n-pentane in the overhead stream of column 60.

Benzene column 30 also produces a benzene-containing sidedraw stream, which is withdrawn from column 30 via conduit 54. This sidedraw stream contains less water than the hydrocarbon phase flowing in conduit 47, since water tends to concentrate in the overhead stream flowing in conduit 36. Hence, this sidedraw stream is generally more desirable than the hydrocarbon phase for use elsewhere in the process. The sidedraw stream flowing in conduit 54 divides into four portions. One portion is recycled to the selective alkylation zone 28 via conduits 56 and 58. A second portion flows to dividing wall distillation column 60 via conduits 62, 82, and 83 to function as reflux in the feed-side section of the middle vapor-liquid contacting area of column 60. A third portion flows via conduit 62, conduit 64, valve 66, and conduit 68 to off-stream sorbent bed 70, where it acts as a desorbent to desorb aromatic byproducts from the sorbent in bed 70. Finally, the fourth portion flows to dividing wall distillation column 60 via conduit 55 to function as reflux below accumulator plate 98 in the sidedraw-side section of the middle vapor-liquid contacting area of column 60. Of course, any of the benzene-containing streams in FIG. 3, including the sidedraw stream in conduit 54, the four portions formed from the sidedraw stream, the vapor phase in conduit 46, the hydrocarbon phase in conduit 47, and the two portions of the hydrocarbon phase, may contain light hydrocarbons having boiling points that are close to that of benzene at the operating conditions of the benzene column 30. Such light hydrocarbons include light naphthenes, such as cyclohexane.

The two main feed streams to dividing wall distillation column 60 are the streams flowing through conduits 136 and 78. The stream flowing in conduit 136 is in large part produced by purging off-stream sorbent bed 120. The effluent of off-stream sorbent bed 120, which contains n-pentane and $C_{10}$–$C_{15}$ paraffins, flows through conduit 126, valve 128, conduit 132, and enters mix drum 130. Fresh dry makeup n-pentane enters mix drum 130 via conduit 134. Since the flow rate and/or the composition of both the effluent in conduit 132 and the makeup stream in conduit 134 can change during a single purging step and/or from one purging step to the next, mix drum 130 provides a buffer or mixing volume to dampen the magnitude of these changes and help prevent upsets in the dividing wall distillation column 60. The flow rate of the effluent of mix drum 130 to column 60 is regulated by a flow controller (not shown) in conduit 136. The other main feed stream, the stream flowing in conduit 78, is produced by desorption of off-stream sorbent bed 70. The effluent of off-stream sorbent bed 70, which contains benzene, aromatic byproducts, n-pentane, and minor amounts of $C_{10}$–$C_{15}$ paraffins, flows through conduit 72, valve 74, conduit 76, and enters mix drum 80. Since the flow rate and/or the composition of the effluent in conduit 76 can change during a single desorption step and/or between desorption steps, mix drum 80 provides a buffer or mixing volume to dampen the magnitude of these changes and help prevent upsets in column 60. The flow rate of the effluent of mix drum 80 to column 60 is regulated by a flow controller (not shown) in conduit 78.

Dividing wall distillation column 60 contains a dividing wall 90 and plates, only some of which are designated in FIG. 3. Plates 84 and 86 are in the feed-side section of the middle vapor-liquid contacting area above and below, respectively, of the inlet of the drum effluent in conduit 78. Plate 102 is in the upper vapor-liquid contacting area above the inlet of the drum effluent in conduit 136 and plate 103 is in the upper vapor-liquid contacting area below that inlet. Plates 96 and 94 are in the sidedraw-side section of the middle vapor-liquid contacting area above and below, respectively of the sidedraw withdrawn in conduit 100. Plate 88 is in the lower vapor-liquid contacting area. Column 60 contains three accumulator plates, which are shown in FIG. 3. Accumulator plate 101 is at the top of dividing wall 90 and collects liquid flowing downward from the upper vapor-liquid contacting area and directs it to the sidedraw-side section of the middle vapor-liquid contacting area. Accumulator plate 98 and its associated downcomer 99 collect liquid flowing downward in the sidedraw-side section of the middle vapor-liquid contacting area and route it from the column 60 into conduit 100. Accumulator plate 92 is at the bottom of dividing wall 90 and collects liquid flowing downward from the middle vapor-liquid contacting area and directs it into the lower vapor-liquid contacting area. Depending on the arrangement and configuration of plates in the middle and lower vapor-liquid contacting areas, accumulator plate 92 may be omitted.

An overhead stream comprising n-pentane is recovered from the top of the dividing wall distillation column 60 and passes via conduit 104 to condenser 106. Using a suitable cooling medium, condenser 106 condenses a portion of the overhead steam and produces a two-phase condenser outlet stream comprising n-pentane-containing vapors and liquids. Condenser outlet stream in conduit 108 enters overhead receiver 110 where the phases separate into uncondensed vapors which leave receiver 110 via conduit 112 and liquid n-pentane which exits receiver 110 via conduit 114. A portion of the liquid n-pentane in conduit 114 refluxes to column 60 via conduit 116 with the remainder recycling to bed 120 via conduits 118, valve 122, and conduit 124.

A bottom stream comprising aromatic byproducts is withdrawn from the bottom of dividing wall distillation column 60 via conduit 138. A portion of the stream in conduit 138 passes through conduit 144, is partially vaporized in reboiler 140 using any suitable heat exchange medium, and returns to column 60 as a two-phase reboiler outlet stream via conduit 146. The remainder of the hydrocarbons in conduit 138 are rejected from the process via conduit 142. A sidedraw comprising benzene, $C_{10}$ to $C_{15}$ paraffins, and possibly a minor amount of n-pentane is withdrawn from column 60 through conduit 100, combines with recycle benzene in conduit 56, and passes to selective alkylation zone 28 via conduit 58. Any n-pentane that is carried with the sidedraw in conduit 100 into the selective alkylation zone 28 generally passes through the selective alkylation zone 28 without undergoing any significant reaction, is recovered in overhead receiver 40, and is recycled to dividing wall distillation column 60 via conduit 53. Similarly, any compounds that co-boil with benzene and which do not react to a significant extent in the selective alkylation zone 28, such as cyclohexane, pass through the selective alkylation zone 28, are recovered from column 30, and are recycled via sidedraw stream 54. Light byproducts that are formed by cracking side reactions in the selective alkylation zone 28 are removed from the process via conduits 46 and 112.

FIG. 1 illustrates a preferred embodiment of subject invention wherein the control apparatus and control system use a dividing wall distillation column, such as shown in FIG. 3, to separate the purging and desorption effluents. For the sake of brevity, items in FIG. 1 that correspond to items that have already been shown and described in FIG. 3 are not shown in or described for FIG. 1. Items in FIG. 1 that correspond to items in FIG. 3 have the same reference number, such as items numbers 55, 78, 83, 100, 112, 118, 136, and 142.

Referring now to FIG. 1, for the purging effluent, a flow measuring device, such as an orifice meter or a turbine meter, establishes a signal representative of the flow rate of purging effluent in conduit 136. The signal representative of the flow rate in conduit 136 is inputted into flow controller 210, which compares the signal with a set point that is representative of the desired flow rate in conduit 136. Flow controller 210 generates output signal 212, which is responsive to the difference between the signal representative of the flow rate in conduit 136 and the set point of flow controller 210. Output signal 212 adjusts the position of regulating valve 214, which changes the flow rate of purging effluent through conduit 136. Another flow measuring device for the desorption effluent establishes a signal representative of the flow rate of desorption effluent in conduit 78. The signal representative of the flow rate in conduit 78 is inputted into flow controller 222, which compares the signal with a set point that is representative of the desired flow rate in conduit 78. Flow controller 222 generates output signal 224, which is responsive to the difference between the signal representative of the flow rate in conduit 78 and the set point of flow controller 222. Output signal 224 adjusts the position of regulating valve 226, which changes the flow rate of desorption effluent in conduit 78. A third flow measuring device for the stream flowing in conduit 83 establishes a signal representative of the flow rate in conduit 83. The signal representative of the flow rate in conduit 83 is inputted into flow controller 216, which compares the signal with a set point that is representative of the desired flow rate in conduit 83. Flow controller 216 generates output signal 218, which is responsive to the difference between the signal representative of the flow rate in conduit 83 and the set point of flow controller 216. Output signal 218 adjusts the position of regulating valve 220, which changes the flow rate of the stream flowing through conduit 83.

In the overhead system of column 60, a pressure measuring device, such as a bellows element or a diaphragm element, establishes a signal representative of the pressure in conduit 107. The signal representative of the pressure in conduit 107 is inputted into pressure controller 262, which compares the signal with a set point that is representative of the desired pressure in conduit 107. Pressure controller 262 generates output signal 264, which is responsive to the difference between the signal representative of the desired pressure in conduit 107 and the set point of pressure controller 262. Output signal 264 adjusts the position of regulating valve 266, which changes the vapor flow through conduit 107. Also, in the overhead system, a differential pressure measuring device, such as a bellows element or a diaphragm element, establishes a signal representative of the difference in pressure between the pressure in conduit 105 and that in conduit 111. Neglecting the pressure drops in conduits 105, 107, 108, and 111 and in overhead receiver 110, this signal is approximately representative of the difference in pressure across regulating valve 266 and condenser 106. This signal is inputted into differential pressure controller 268, which compares the signal with a set point that is representative of the desired differential pressure across regulating valve 266 and condenser 106. Differential pressure controller 268 generates output signal 270, which is responsive to the difference between the set point of controller 268 and the signal that is representative of the pressure difference across regulating valve 266 and condenser 106. Output signal 270 adjusts the position of regulating valve 272, which changes the flow of vapor that bypasses regulating valve 266 and condenser 106. In the overhead system of column 60, there is also a flow measuring device, such as an orifice meter or a turbine meter, which establishes a signal representative of the flow rate of net overhead liquid in conduit 118. The signal representative of the flow rate in conduit 118 is inputted into flow controller 274, which compares the signal with a set point that is representative of the desired flow rate in conduit 118. Flow controller 274 generates output signal 276, which is responsive to the difference between the signal representative of the desired flow rate in conduit 118 and the set point of flow controller 274. Output signal 276 adjusts the position of regulating valve 278, which changes the net liquid flow rate through conduit 118. Although not shown in FIGS. 1 and 3, a liquid level measuring device may be used to measure the liquid level in overhead receiver 110. The signal representative of the liquid level from such a level measuring device is preferably used only for indication and/or recording, rather than controlling, purposes. Thus, during normal operation, the overhead receiver functions as a surge volume and the liquid level is allowed to fluctuate somewhat depending on the liquid inflow to and outflow from the overhead receiver 110.

In the sidedraw-side section of column 60, each of two temperature measuring devices 251 and 253 establishes a signal representative of the temperature of the fluid at each of two respective plates in the sidedraw section of column 60. Each signal is inputted into summing device 252. Summing device 252 multiplies one of the signals by a scalar of 0.6 to compute a first product, multiplies the other signal by a scalar of 0.4 to arrive at a second product, adds the two products, and then generates output signal 254 which is representative of the sum of the products. Output signal 254 in turn is inputted into controller 255, which compares output signal 254 with a set point that is representative of the desired sum of the products and establishes output signal 256. Output signal 256 is responsive to the difference between output signal 254 and the set point of controller 255. Output signal 256 is the set point to flow controller 257, which compares that set point with a signal representative of the reflux flow rate through conduit 116 measured by a flow measuring device, such as an orifice meter or a turbine meter. Flow controller 257 establishes output signal 258 which is representative of the difference between output signal/set point 256 and the signal representative of the reflux flow rate through conduit 116. Output signal 258 adjusts the position of regulating valve 260, which changes the reflux flow rate.

Also in the sidedraw section of column 60, a liquid level measuring instrument, such as a float-actuated device or a head device, establishes a signal representative of the liquid level in downcomer 99. The signal is inputted into liquid level controller 246, which compares the signal representative of the liquid level in downcomer 99 with a set point that is representative of the desired liquid level in downcomer 99. Level controller 246 establishes output signal 247, which is responsive to the difference between the signal representative of the liquid level in downcomer 99 and the set point of controller 246. Output signal 247 is the set point to flow controller 248, which compares that set point with a signal representative of the sidedraw stream in conduit 100 measured by a flow measuring device, such as an orifice meter or a turbine meter. Flow controller 248 establishes output signal 249 which is representative of the difference between output signal/set point 247 and the signal representative of the sidedraw flow rate. Output signal 249 adjusts the position of regulating valve 250, which changes the flow rate of the sidedraw in conduit 100.

In the lower vapor-liquid contacting area of column 60, a temperature measuring device 239 establishes a signal representative of the temperature of the fluid at a plate in the lower vapor-liquid contacting area of column 60. That signal in turn is inputted into temperature controller 240, which compares the signal representative of the fluid temperature on the plate with a set point that is representative of the desired fluid temperature on that plate and establishes output signal 241. Output signal 241 is responsive to the difference between the signal representative of the fluid temperature and the set point of temperature controller 240. Output signal 241 is the set point to flow controller 242, which compares that set point with a signal representative of the flow rate of the stream through conduit 55 to the sidedraw section below accumulator plate 98 in column 60. The flow rate through conduit 55 is measured by a flow measuring device, such as an orifice meter or a turbine meter. Flow controller 242 establishes output signal 243 which is representative of the difference between output signal/set point 241 and the signal representative of the flow rate through conduit 55. Output signal 243 adjusts the position of regulating valve 244, which changes the flow rate through conduit 55.

Also in the lower vapor-liquid contacting area of column 60, a liquid level measuring instrument, such as a float-actuated device or a head device, establishes a signal representative of the liquid level in the bottom of column 60. The signal is inputted into level controller 228, which compares the signal representative of the liquid level in the bottom of column 60 with a set point that is representative of the desired liquid level in the bottom of column 60. Level controller 228 establishes output signal 230, which is responsive to the difference between the signal representative of the liquid level in the bottom of column 60 and the set point of controller 228. Output signal 230 is the set point to flow controller 231, which compares that set point with a signal representative of the bottom stream in conduit 142 measured by a flow measuring device, such as an orifice meter or a turbine meter. Flow controller 231 establishes output signal 232 which is representative of the difference between output signal/set point 230 and the signal representative of the bottoms stream flow rate. Output signal 232 adjusts the position of regulating valve 233, which changes the flow rate of the bottom stream in conduit 142.

For reboiler 140, a flow measuring device, such as an orifice meter or a turbine meter, establishes a signal representative of the flow rate of a heat exchange medium, such as hot oil or steam, to reboiler 140. The signal representative of the flow rate of heat exchange medium to reboiler 140 is inputted into flow controller 234, which compares the signal with a set point that is representative of the desired flow rate of heat exchange medium to reboiler 140. Flow controller 234 generates output signal 236, which is responsive to the difference between the signal representative of the flow rate of heat exchange medium to reboiler 140 and the set point of flow controller 234. Output signal 236 adjusts the position of regulating valve 238, which changes the flow rate of heat exchange medium flowing from reboiler 140.

FIG. 2 illustrates a preferred embodiment of subject invention wherein the control apparatus and control system are used with two thermally coupled distillation columns 410 and 420, rather than a single dividing wall distillation column 60 as in FIGS. 1 and 3, to separate the purging and desorption effluents. For the sake of brevity, items in FIG. 2 that correspond to items that have already been shown and described in FIGS. 1 and 3 are not shown in or described for FIG. 2. Items in FIG. 2 that correspond to items in FIGS. 1 and 3 have the same reference number, such as items numbers 55, 78, 83, 100, 112, 118, 136, and 142. Also, for example, control equipment and signals which have a similar function in both FIGS. 1 and 2 have the same reference number.

Referring now to FIG. 2, a stream produced in large part by desorbing the off-stream sorbent bed 70 flows via conduit 78 into preheat exchanger 412. In exchanger 412, the desorption effluent is heated by indirect heat exchange with a suitable heat exchange medium. The heated stream flows through conduit 414 and enters prefractionator 410. Prefractionator 410 contains plates, one of which is denoted as item 418. A prefractionator overhead stream is recovered from the top of prefractionator 410 via conduit 416 and passes to main column 420. A liquid stream flows to the top of prefractionator 410 via conduit 83. A prefractionator bottom stream is recovered from the bottom of prefractionator 410 and flows through conduit 422 to main column 420.

Main column 420 contains plates, only some of which are designated in FIG. 2. Plate 456 is above the sidedraw 100, plate 450 is below the sidedraw and above the inlet of the prefractionator bottom stream, and plate 446 is below the inlet of the prefractionator bottom stream. Column 420 contains two accumulator plates, which are shown in FIG. 2. Accumulator plate 454 and its associated downcomer 452 collect liquid flowing downward in the main column 420 and route it from the column 420 into conduit 100. Accumulator plate 448 collects liquid flowing downward in the main column 420 and liquid from the prefractionator bottom stream and re-directs it to the lower plates, such as plate 446.

A main column vapor draw stream flows from main column 420 to the bottom of prefractionator 410 through conduit 424. A stream produced in large part by purging off-stream sorbent bed 120 flows via conduit 136 into the upper vapor-liquid contacting area of main column 420. A main column overhead stream comprising n-pentane is recovered from the top of main column 420 and passes via conduit 426, conduit 427, and valve 266 to condenser 429. Condenser 429 uses a suitable cooling medium and condenses a portion of the main column overhead steam and produces a two-phase condenser outlet stream comprising n-pentane vapors and liquids. The condenser outlet stream in conduit 432 enters overhead receiver 430 where the phases separate into uncondensed vapors which leave receiver 430 via conduit 112 and liquid n-pentane which exits receiver 430 via conduit 434. A portion of the n-pentane liquid in conduit 434 refluxes to main column 420 via conduit 436 with the remainder being recycled.

A main column bottom stream comprising aromatic byproducts is withdrawn from the bottom of main column 420 via conduit 438. A portion of the aromatic byproducts in conduit 438 passes through conduit 442, is partially vaporized in reboiler 440 using any suitable heat exchange medium, and returns to main column 420 as a two-phase reboiler outlet stream via conduit 444. The remainder of the aromatic byproducts in conduit 438 are rejected from the process via conduit 142. The sidedraw stream comprises benzene and $C_{10}$ to $C_{15}$ paraffins and passes to selective alkylation zone 28. A liquid stream comprising benzene is introduced to main column 420 via conduit 55 to function as reflux below accumulator plate 454.

Unlike the control apparatus and method shown in FIG. 1, the apparatus and method illustrated in FIG. 2 uses one temperature measuring device to establish a signal representative of the temperature of the fluid at one of the plates in the prefractionator 410. The signal is inputted into temperature controller 255, which compares the signal representative of the temperature of the fluid on the plate in the prefractionator 410 with a set point that is representative of the desired temperature of fluid on the plate and establishes output signal 256. Output signal 256 is thus responsive to the difference between the desired temperature of fluid on the plate and the set point of controller 255. Output signal 256 is the set point to flow controller 257, which compares that set point with a signal representative of the reflux flow rate through conduit 436 measured by a flow measuring device, such as an orifice meter or a turbine meter. Flow controller 257 establishes output signal 258 which is representative of the difference between output signal/set point 256 and the signal representative of the reflux flow rate through conduit 436. Output signal 258 adjusts the position of regulating valve 260, which changes the reflux flow rate.

In the overhead system of main column 420, a pressure measuring device establishes a signal representative of the pressure in conduit 427. The signal representative of the pressure in conduit 427 is inputted into pressure controller 262, which compares the signal with a set point that is representative of the desired pressure in conduit 427. Pressure controller 262 generates output signal 264, which is responsive to the difference between the signal representative of the desired pressure in conduit 427 and the set point of pressure controller 262. Output signal 264 adjusts the position of regulating valve 266, which changes the vapor flow through conduit 427. Also, in the overhead system, a differential pressure measuring device, such as a bellows element or a diaphragm element, establishes a signal representative of the difference in pressure between the pressure in conduit 428 upstream and downstream of regulating valve 272. Neglecting the pressure drops in conduits and in overhead receiver 430, this signal is approximately representative of the difference in pressure across regulating valve 266 and condenser 429. This signal is inputted into differential pressure controller 268, which compares the signal with a set point that is representative of the desired differential pressure across regulating valve 266 and condenser 429. Differential pressure controller 268 generates output signal 270, which is responsive to the difference between the set point of controller 268 and the signal that is representative of the pressure difference across regulating valve 266 and condenser 429. Output signal 270 adjusts the position of regulating valve 272, which changes the flow of vapor that bypasses regulating valve 266 and condenser 429. Although not shown in the FIG. 2, a liquid level measuring device may be used to measure the liquid level in overhead receiver 430. The signal representative of the liquid level from such a level measuring device is preferably used only for indication and/or recording, rather than controlling, purposes. Thus, during normal operation, the overhead receiver functions as a surge volume and the liquid level is allowed to fluctuate somewhat depending on the liquid inflow to and outflow from the overhead receiver 430.

EXAMPLES

The following examples illustrates an embodiment of the invention and refer to FIGS. 1 and 3. Dividing wall distillation column 60 is used to separate three streams: a desorption effluent containing benzene, aromatic byproducts, and relatively minor amounts of $C_{10}$–$C_{14}$ paraffins, which enters column 60 through control valve 226 on flow control via conduit 78, a purging effluent mainly containing n-pentane with some $C_{10}$–$C_{14}$ paraffins which enters column 60 through control valve 214 on flow control via conduit 136, and a drag stream mainly containing benzene which enters column 60 in combination with the feed-side external reflux through control valve 220 on flow control via conduit 83. The separation produces three streams: an overhead stream containing n-pentane which flows through control valve 278 on flow control via conduit 118, a sidedraw stream mainly containing benzene and the $C_{10}$–$C_{14}$ paraffins which flows through control valve 250 on liquid level control via conduit 100, and a bottom stream mainly containing aromatic byproducts which flows through control valve 233 on liquid level control via conduit 142. A reflux stream generated by the overhead system of column 60 is refluxed to column 60 through control valve 260 on temperature control via conduit 116. Two external streams which are mainly benzene are introduced into column 60 to function, in effect, as reflux: a feed-side external stream enters column 60 in a combined stream with the drag stream through control valve 220 on flow control via conduit 83, and a sidedraw-side section external stream enters column 60 through control valve 244 on flow control via conduit 55. The concentration of n-pentane in the sidedraw stream is less than 0.1 mol-%, and the concentration of aromatic byproducts in the sidedraw stream is less than 0.1 mol-%. More than 99.9 mol-% of the benzene in the entering streams are recovered in the sidedraw stream. More than 99.9 mol-% of the n-pentane in the entering streams is recovered in the overhead stream. More than 99.9 mol-% of the entering aromatic byproducts is recovered in the bottom stream. Essentially all of the $C_{10}$–$C_{14}$ paraffin component(s) entering with the purging effluent stream is recovered in the sidedraw stream. In the overhead stream, the concentration of n-pentane is more than 99.9 mol-%, and the concentration of benzene in less than 0.1 mol-%. In the bottom stream, the concentration of benzene is less then 0.5 wt-ppm. These examples are based on engineering calculations and scientific distillation predictions, and are not intended to limit the invention as set forth in the claims.

The process flow for these examples is the same as that shown in FIGS. 1 and 3, except that no fresh makeup pentane is introduced to the process via conduit 134. The composition of the purging effluent flowing in conduit 126 fluctuates over a 40-minute cycle. The concentration of n-pentane in the purging effluent is more than 99.9 mol-% at the beginning of the cycle in the composition of the purging effluent, decreases to about 90 mol-% during the cycle, and rises back to 99.9 mol-% by the end of the cycle. The composition of the desorption effluent flowing in conduit 72 also exhibits a 40-minute cycle. The concentration of n-pentane is about 0 mol-% at the beginning of the cycle in the composition of the desorption effluent, increases to about 12 mol-% during the cycle, and falls back to about 0 mol-% by the end of the cycle. The concentration of aromatic byproducts in the desorption effluent is relatively high at the beginning of the cycle in the composition of the desorption effluent, decreases to a minimum during the cycle, and increases back to a relatively high concentration at the end of the cycle. When the concentration of n-pentane in the desorption effluent is about 0 mol-%, the concentration of benzene is about 95 mol-%.

The control system for these examples is the same as that shown in FIG. 1, except for the manner in which a signal is generated that corresponds to the temperature at an elevation in column 60 above the elevation at which the sidedraw is withdrawn. Instead of measuring two temperatures on the sidedraw-side section of the middle vapor-liquid contacting area, inputting those temperatures into a summing device 252, generating an output signal 254 from the summing device, and inputting output signal 254 into temperature controller 257, as shown in FIG. 1, in these examples a single temperature is measured in the upper vapor-liquid contacting area of column 60 at the fourteenth plate (plate #14), numbered from the top of the column 60, and a signal corresponding to that single temperature is inputted into temperature controller 255. Thus, in this example no summing device 252 is used and no signal 254 is generated. Plate #14 is above accumulator plate 101 but below not only the elevation at which the reflux is introduced via conduit 116 but also the elevation at which the purging inlet is introduced via conduit 136. The plates in column 60 in this example have a plate efficiency of 80%.

Although this control system produces some cyclical variations in the flow rate of reflux in conduit 116, in the temperature of tray 14 and its corresponding signal 254, and in the flow rate of n-pentane which exits column 60 with the sidedraw in conduit 100, the amplitudes of these cyclical variations can be significantly decreased and their periods can be significantly increased by tuning of temperature controller 255, so that the column 60 operates within commercial operating specifications and limits. Examples 1 and 2 illustrate the effects of tuning temperature controller 255.

Example 1

Example 1 illustrates an embodiment of the invention where the temperature controller 255 is tuned relatively more aggressively. In this example, temperature controller 255 causes a relatively large amplitude and a relatively short period in the cyclical variation in the flow of reflux in conduit 116, a relatively large range of temperatures at plate #14 in excess of the temperature set point of controller 255, and a relatively high peak and a relatively short period in the cyclical variation in the flow of n-pentane in conduit 100. The combined effect of this relatively more aggressive tuning of temperature controller 255 is a relatively high average flow rate of n-pentane in conduit 100. See the Table.

Example 2

Example 2 illustrates an embodiment of the invention where the temperature controller 255 is tuned relatively less aggressively than in Example 1. In this example, temperature controller 255 causes a relatively small amplitude and a relatively long period in the cyclical variation in the flow of reflux in conduit 116, a relatively small range of temperatures at plate #14 in excess of the temperature set point of controller 255, and a relatively low peak and a relatively long period in the cyclical variation in the flow of n-pentane in conduit 100. The combined effect of this relatively less aggressive tuning of temperature is a relatively low average flow rate of n-pentane in conduit 100. See the Table. A comparison of Examples 1 and 2 shows that relatively less aggressive tuning of temperature controller 255 is preferred.

TABLE

| Process Parameter | Tuning of Temperature Controller 255 | |
| --- | --- | --- |
| | More Aggressive | Less Aggressive |
| Amplitude of cyclical variation in flow rate of reflux in conduit 116, % of average flow rate of reflux | 29 | 6 |
| Period of cyclical variation in flow rate of reflux in conduit 116, time units | Base | 2.5 × Base |
| Range of temperatures at plate #14 in excess of the set point temperature of temperature controller 255, ° F. | Base | Base - 8° F. |
| Peak flow rate of n-pentane in conduit 100, flow units | Base | 0.017 × Base |
| Period of cyclical variation in flow rate of n-pentane in conduit 100, time units | Base | 4.6 × Base |
| Average flow rate of n-pentane in conduit 100, flow units | Base | 0.015 × Base |

What is claimed is:

1. In an apparatus comprising a dividing wall distillation column, the column having a shell defining a middle vapor-liquid contacting area containing at least one vertically oriented partition dividing the middle vapor-liquid contacting area into at least a feed section defined by the shell and the partition and a sidedraw section defined by the shell and the partition, an upper vapor-liquid contacting area being above and in communication with the middle vapor-liquid contacting area, and a lower vapor-liquid contacting area being below and in communication with the middle vapor-liquid contacting area, the column having a first inlet port in communication with the upper vapor-liquid contacting area, a second inlet port in communication with the feed section, and an outlet port in communication with the sidedraw section, the improvement comprising
  a) a temperature measuring device operably connected to the column to measure temperature in the column and to establish a temperature signal representative of temperature in the column, wherein the temperature measuring device is vertically spaced above the outlet port;
  b) a controller to receive a controller input signal responsive to the temperature signal, to compare the controller input signal to a set point, and to establish a controller output signal responsive to the difference between the controller input signal and the set point; and
  c) a means for adjusting temperature in the column, the means being responsive to the controller output signal, wherein the upper vapor-liquid contacting area is in communication with a contact condenser and the means for adjusting temperature comprises a valve operably located to control the flow of a cooling medium to the contact condenser.

2. An apparatus comprising
  a) a distillation column having a shell defining a middle vapor-liquid contacting area, an upper vapor-liquid contacting area above and in communication with the middle vapor-liquid contacting area, and a lower vapor-liquid contacting area below and in communication with the middle vapor-liquid contacting area;
  b) at least one vertically oriented partition dividing the middle vapor-liquid contacting area into at least a feed section defined by the shell and the partition and a sidedraw section defined by the shell and the partition;
  c) a first inlet port in communication with the upper vapor-liquid contacting area;
  d) a second inlet port in communication with the feed section;
  e) an outlet port in communication with the sidedraw section;
  f) a temperature measuring device operably connected to the column to measure temperature in the column and to establish a temperature signal representative of temperature in the column, wherein the temperature measuring device is vertically spaced above the outlet port;
  g) a controller to receive a controller input signal responsive to the temperature signal, to compare the controller input signal to a set point, and to establish a controller output signal responsive to the difference between the controller input signal and the set point; and
  h) a means for adjusting temperature in the column, the means being responsive to the controller output signal, wherein the upper vapor-liquid contacting area is in communication with a contact condenser, and the means for adjusting temperature comprises a valve operably located to control the flow of a cooling medium to the contact condenser.

* * * * *